United States Patent
Lauder et al.

(10) Patent No.: US 10,710,245 B2
(45) Date of Patent: Jul. 14, 2020

(54) QUICK-CHANGE CLAMP ARMS FOR ROBOT END EFFECTORS, SYSTEMS INCLUDING THE SAME, AND RELATED METHODS

(71) Applicant: The Boeing Company, Chicago, IL (US)

(72) Inventors: Arnold John Lauder, Oak Bluff (CA); David C. Boonstra, Dugald (CA); Antonio M. Ferreira, Petersfield (CA); Alan Wright, Winnipeg (CA); Garth Vincent Kummen, Stonewall (CA); Demsey Drew Kirkwood, Melbourne (AU)

(73) Assignee: The Boeing Company, Chicago, IL (US)

( * ) Notice: Subject to any disclaimer, the term of this patent is extended or adjusted under 35 U.S.C. 154(b) by 626 days.

(21) Appl. No.: 15/205,734

(22) Filed: Jul. 8, 2016

(65) Prior Publication Data
US 2018/0009113 A1    Jan. 11, 2018

(51) Int. Cl.
*B25J 15/00*    (2006.01)
*B25J 15/04*    (2006.01)

(52) U.S. Cl.
CPC ....... *B25J 15/0019* (2013.01); *B25J 15/0433* (2013.01); *B25J 15/0491* (2013.01); *Y10S 483/901* (2013.01)

(58) Field of Classification Search
CPC ................ B25J 15/0019; B25J 15/0491; B25J 15/0433; B25J 15/0475; Y10S 483/901;
(Continued)

(56) References Cited

U.S. PATENT DOCUMENTS

| | | | | |
|---|---|---|---|---|
| 2,392,999 | A | * | 1/1946 | Redmer ................ B23B 31/204 279/4.04 |
| 3,861,252 | A | * | 1/1975 | Stoffels ................. B23B 31/18 82/165 |

(Continued)

FOREIGN PATENT DOCUMENTS

FR            002646371        * 11/1990

*Primary Examiner* — Monica S Carter
*Assistant Examiner* — Mahdi H Nejad
(74) *Attorney, Agent, or Firm* — DASCENZO Intellectual Property Law, P.C.

(57) ABSTRACT

Presently disclosed systems and methods provide for a quick-change clamp arm that may be coupled to and removed from a robot end effector via a quick-change feature coupled to the robot end effector. Systems may include a plurality of such quick-change clamp arms that each may be coupled to a given robot end effector such that when one is removed, a different respective quick-change clamp arm may be coupled to the robot end effector. The robot end effector may be configured to perform a task to one side of a workpiece, while the quick-change clamp arm applies a stabilizing normal force to the other side of the workpiece. Due to the interchangeable nature of presently disclosed quick-change clamp arms, systems may reduce the number of robot end effectors required for a given manufacturing process. Related methods of removing and coupling quick-change clamp arms to robot end effectors may be automated.

20 Claims, 6 Drawing Sheets

(58) Field of Classification Search
CPC .... Y10S 901/30; Y10S 901/31; Y10S 901/41; Y10S 901/42; B23Q 3/12; B23Q 3/14; B23Q 3/155; B23Q 3/15506; B23Q 3/15513; B23Q 3/4552; B23Q 3/1556; B23Q 3/15586; B23Q 3/15706
USPC .............. 269/32, 309; 279/4.04, 4.12, 4.11
See application file for complete search history.

(56) References Cited

U.S. PATENT DOCUMENTS

| | | | | |
|---|---|---|---|---|
| 4,402,239 A | * | 9/1983 | Mooney | E21B 19/166 81/57.16 |
| 4,486,928 A | * | 12/1984 | Tucker | B23Q 7/046 29/26 A |
| 4,604,787 A | * | 8/1986 | Silvers, Jr. | B23Q 3/15526 29/26 A |
| 5,743,687 A | * | 4/1998 | Ribic | B23B 31/261 269/309 |
| 5,961,258 A | * | 10/1999 | Ende | B21J 15/10 408/100 |
| 6,056,472 A | * | 5/2000 | Latulippe | B29C 45/1775 403/299 |
| 6,095,509 A | * | 8/2000 | Yonezawa | B23B 31/202 269/309 |
| 6,210,084 B1 | | 4/2001 | Banks et al. | |
| 8,096,038 B2 | | 1/2012 | Condliff | |
| 8,925,184 B2 | | 1/2015 | Condliff | |
| 10,065,327 B1 | * | 9/2018 | Chen | B25J 15/0408 |
| 2006/0257220 A1 | * | 11/2006 | Gertner | B23B 49/005 408/202 |
| 2009/0075796 A1 | * | 3/2009 | Doll | B25J 15/0491 483/59 |
| 2014/0376998 A1 | * | 12/2014 | Gamain | F16B 9/023 403/322.4 |
| 2016/0325360 A1 | * | 11/2016 | Martin | B23B 31/4033 |
| 2017/0216983 A1 | * | 8/2017 | Dohi | B23Q 3/103 |
| 2018/0065208 A1 | * | 3/2018 | Mori | B23B 3/22 |
| 2019/0299426 A1 | * | 10/2019 | Ozog | B25J 18/02 |
| 2019/0308319 A1 | * | 10/2019 | Walters | F04D 29/644 |

\* cited by examiner

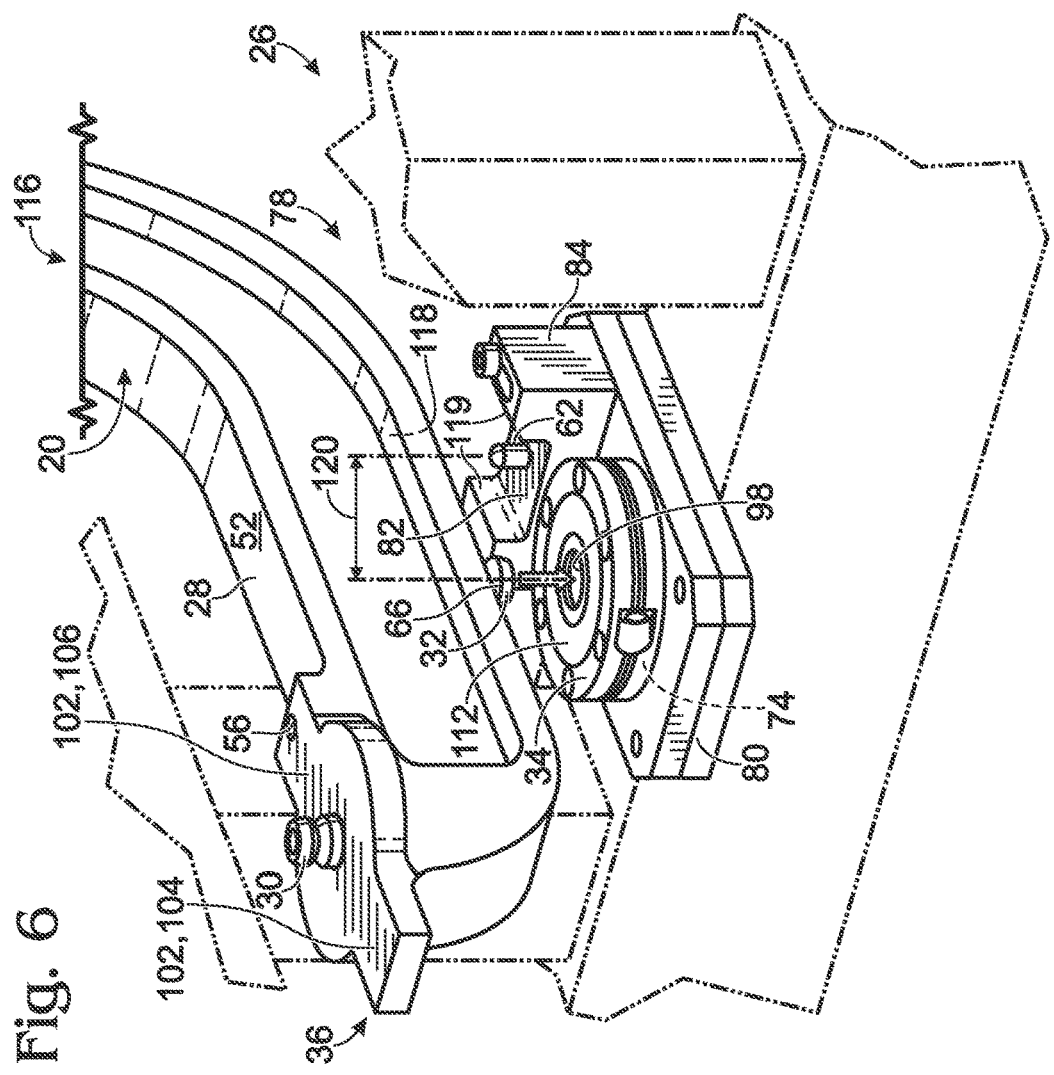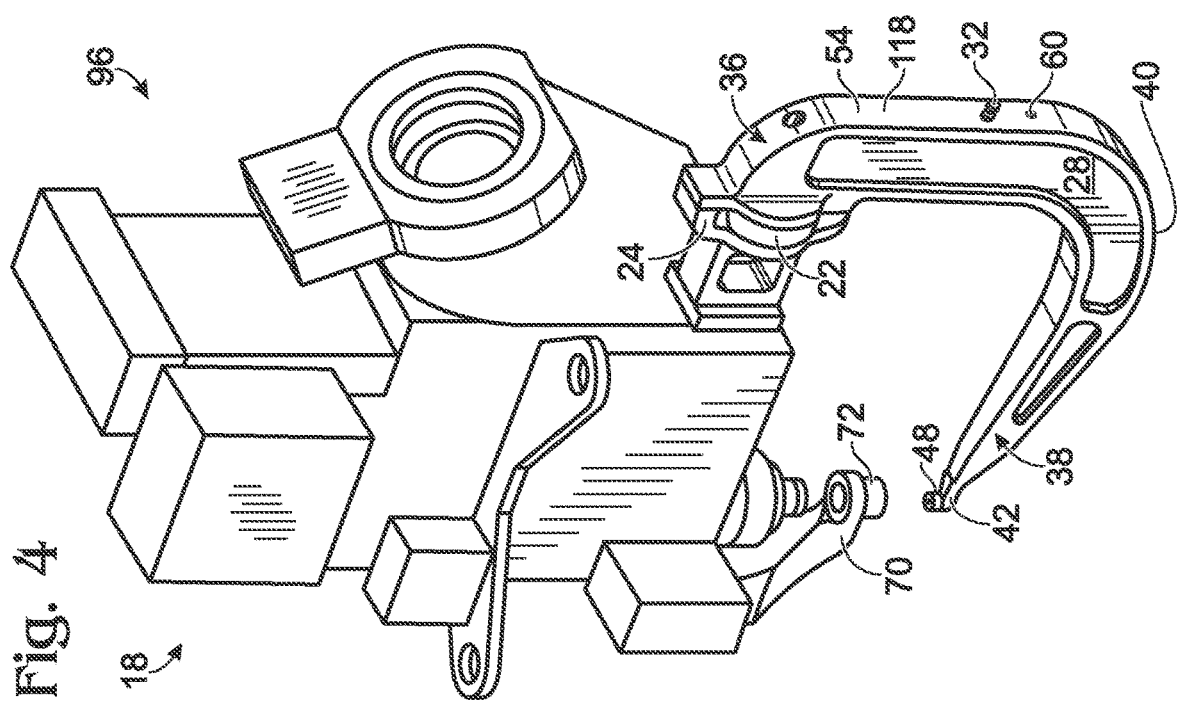

US 10,710,245 B2

QUICK-CHANGE CLAMP ARMS FOR ROBOT END EFFECTORS, SYSTEMS INCLUDING THE SAME, AND RELATED METHODS

FIELD

The present disclosure relates to quick-change clamp arms for robot end effectors, systems including the same, and related methods.

BACKGROUND

Industrial robots are often used in manufacturing processes for applications such as welding, painting, assembly, pick and place, product inspection, testing, and drilling. In some processes, robots are used to perform tasks that might be challenging or dangerous for a human to perform, and often provide advantages in speed, endurance, and precision. In many instances, a variety of robots are used in different work cells to perform different tasks on a workpiece. Within a work cell, the robot often must use a plurality of different end effectors, such as a variety of different drill motor assemblies, to perform different tasks on a given workpiece.

Robot tasks, such as drilling holes in a workpiece, often utilize clamp arms to apply normal forces to one side of the workpiece, thereby stabilizing the workpiece while the other side of the workpiece is being drilled. These clamp arms are typically large, heavy, and difficult to safely handle and store, and therefore are secured to the end effector (e.g., the clamp arms are typically bolted directly to the end effectors, thereby requiring a separate end effector assembly for each of the different clamp arm configurations). Changing the end effector/clamp arm is performed manually, which is time-consuming, interrupts process flow in the work cell, and is potentially unsafe. Furthermore, the number of end effectors required for a given work cell may be dictated by the number of different clamp arms, which significantly increases costs associated with the manufacturing process.

SUMMARY

Presently disclosed quick-change clamp arms, systems including the same, and related methods may reduce the number of end effectors required for a given work cell operation, compared to conventional systems. Quick-change clamp arms may be utilized in automated systems such that a given respective end effector may be quickly connected to any of a plurality of different quick-change clamp arms. Further, the quick-change clamp arm may be removed and replaced with a different quick-change clamp arm on the same end effector by the automated system, without requiring manual intervention, without interrupting the process flow, and without requiring a separate end effector for each different quick-change clamp arm.

For example, one embodiment of a quick-change clamp arm for use with a robot end effector according to the present disclosure includes a clamp arm body, a first anchor pin fixed to and extending from the clamp arm body, and a second anchor pin fixed to and extending from the clamp arm body. The first anchor pin is configured to be selectively and reversibly connected to a first quick-change feature of the robot end effector, such that the quick-change clamp arm is configured to be selectively and removably coupled to the robot end effector via the first anchor pin. The second anchor pin is configured to be selectively and reversibly connected to a second quick-change feature apart from the robot end effector, such as to a second quick-change feature coupled to a storage rack for storing a plurality of such quick-change clamp arms. The clamp arm body generally includes a proximal end region, a distal end region, and a pressure foot. While the quick-change clamp arm is coupled to the robot end effector, the pressure foot is configured to apply a normal force to a first side of a workpiece while the robot end effector performs an operation on a second side of the workpiece.

One example of a disclosed automated system includes a quick-change clamp arm according to the present disclosure and a robot end effector according to the present disclosure. Such presently disclosed robot end effectors include a first quick-change feature for engaging the first anchor pin of the quick-change clamp arm, as well as a tool configured for performing the task on the workpiece. Generally, the first quick-change feature is coupled to the robot end effector via a clamp arm adapter that is configured such that when the quick-change clamp arm is engaged with the first quick-change feature of the robot end effector, the quick-change clamp arm is oriented and positioned as desired for performing a task on a workpiece (e.g., the quick-change clamp arm is positioned for applying a normal force to one side of the workpiece while the tool of the robot end effector performs a task on the other side of the workpiece).

Related methods are also disclosed. For example, methods may include removing a first quick-change clamp arm (or other hardware article) from a robot end effector by disengaging a first quick-change feature coupling the first quick-change clamp arm to the robot end effector, and coupling a second quick-change clamp arm to the robot end effector by engaging the anchor pin of the second quick-change clamp arm with the first quick-change feature, thereby coupling the second quick-change clamp arm to the robot end effector. The removing the first quick-change clamp arm from the robot end effector and the coupling the second quick-change clamp arm to the robot end effector may each be automated. Such presently disclosed apparatus, systems, and methods may reduce the required hardware in a given work cell (e.g., reduce the number of required robot end effectors for a given manufacturing process) due to the interchangeability and ability to use multiple different quick-change clamp arms with a particular robot end effector.

BRIEF DESCRIPTION OF THE DRAWINGS

FIG. 4 is a perspective view of one example of a robot end effector and quick-change clamp arm coupled together via a first quick-change feature, according to the present disclosure.

FIG. 6 is a close-up perspective view of one example of a quick-change clamp arm being coupled to a storage rack via a second quick-change feature, according to the present disclosure.

DESCRIPTION

Apparatuses, systems, and methods for performing one or more automated tasks on a workpiece are disclosed. Generally, in the figures, elements that are likely to be included in a given example are illustrated in solid lines, while elements that are optional to a given example are illustrated in broken lines. However, elements that are illustrated in solid lines are not essential to all examples of the present disclosure, and an element shown in solid lines may be omitted from a particular example without departing from the scope of the present disclosure.

Figure 1:
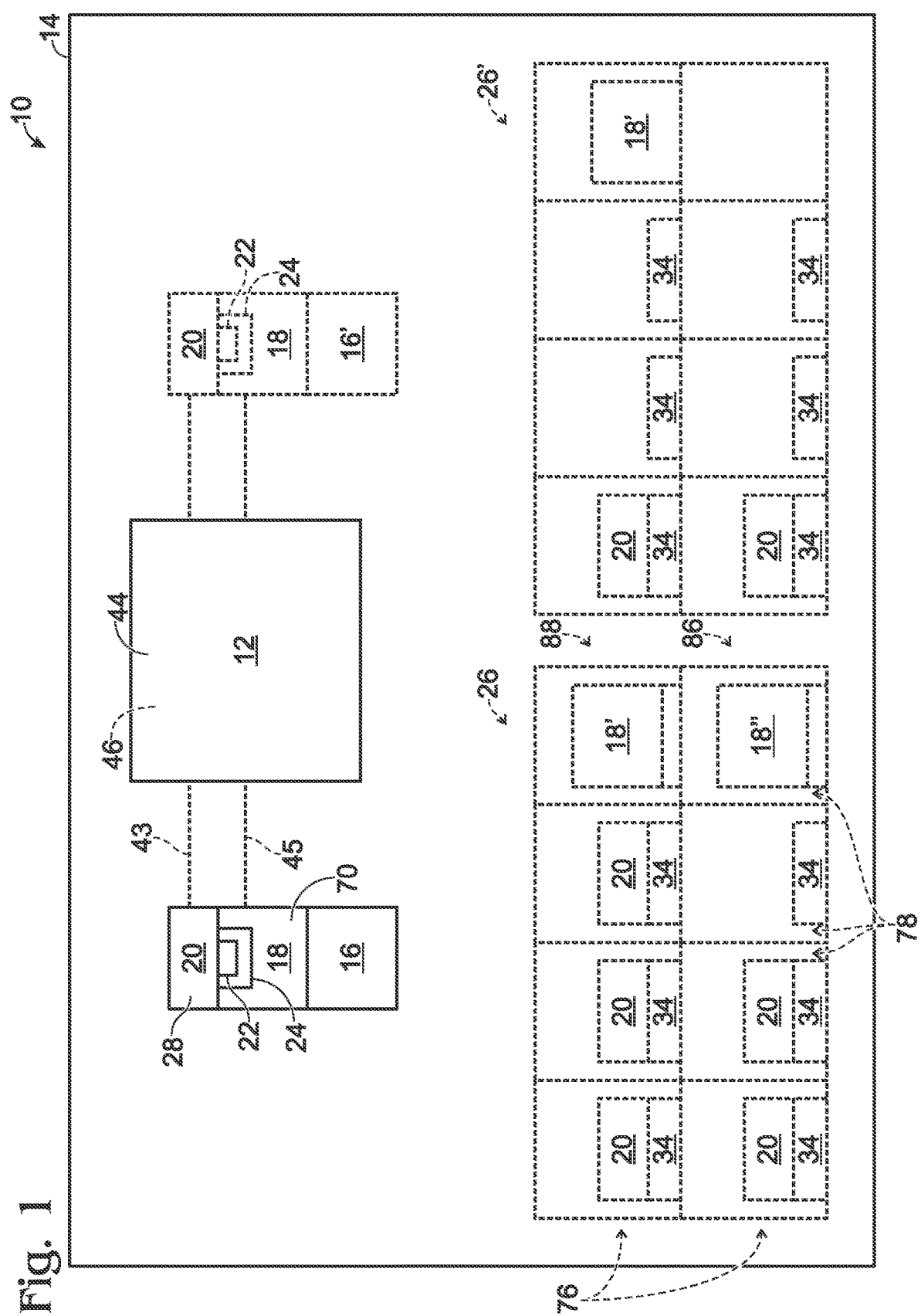
FIG. 1 is a schematic view of illustrative, non-exclusive examples of systems for performing a task on a workpiece in a work cell, according to the present disclosure.
Figure 2:
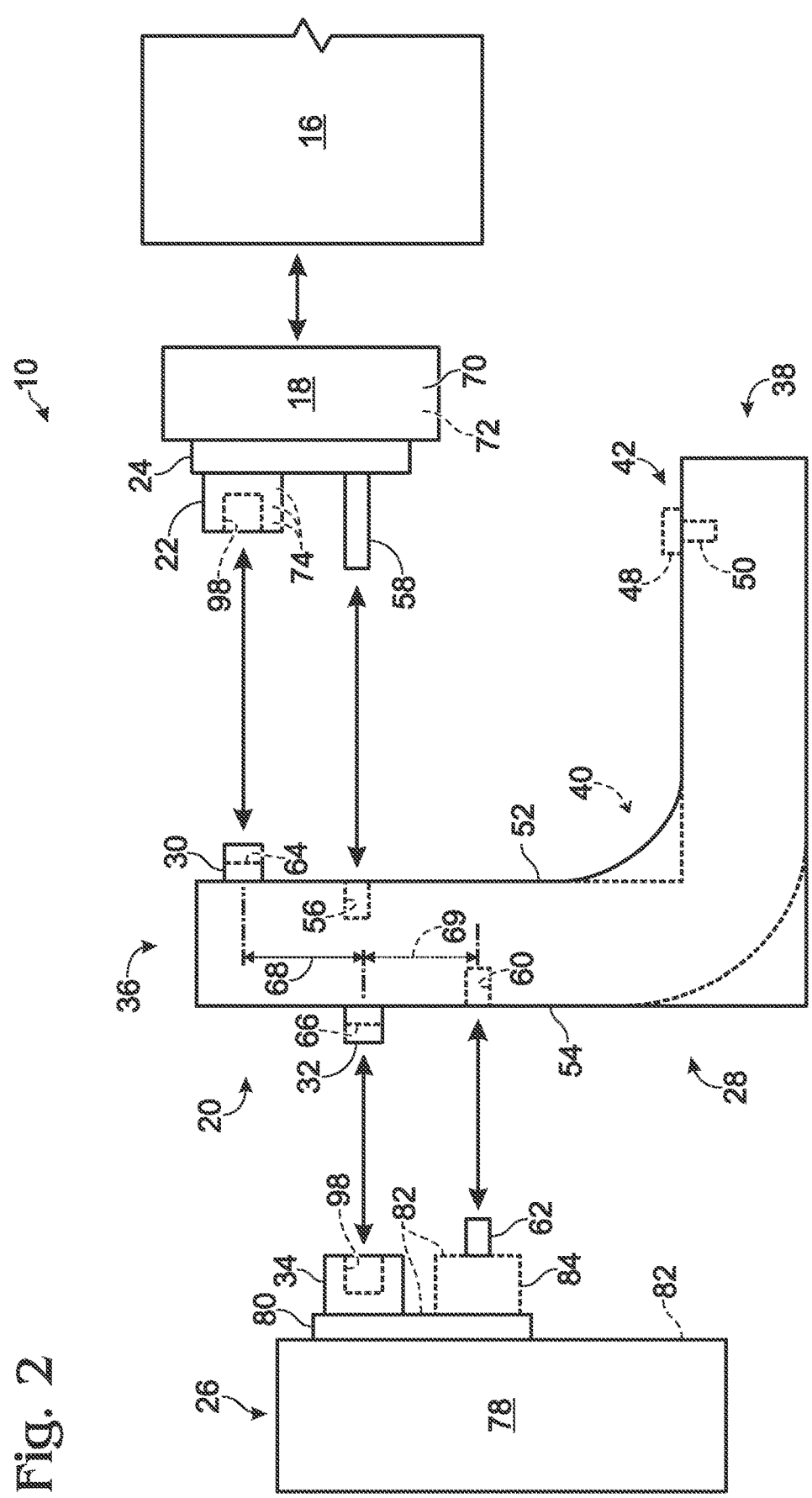
FIG. 2 is a schematic view of illustrative, non-exclusive examples of systems according to the present disclosure.

FIGS. 1-2 schematically illustrate systems 10 according to the present disclosure. Generally, systems 10 are configured to perform an automated manufacturing or assembly process (e.g., an "operation," or a "task") on a workpiece 12, which may be positioned within a work cell 14 (FIG. 1). Work cell 14 may be structurally defined and separated from other areas, or may simply be an area near workpiece 12. At least a first robot 16 (also referred to herein as simply robot 16) may be located near workpiece 12 (e.g., within work cell 14) in order to perform one or more tasks on workpiece 12. In systems 10 of the present disclosure, robot 16 includes a robot end effector 18 and a quick-change clamp arm 20 coupled to robot end effector 18 via a first quick-change feature 22 (which in turn, is coupled to robot end effector 18 via a clamp arm adapter 24). Systems 10 may include a storage rack 26 having a plurality of quick-change clamp arms stored therein, such that robot 16 may be configured to disengage quick-change clamp arm 20, place it in storage rack 26, and engage a second respective quick-change clamp arm from storage rack 26, as will be explained in more detail below.

FIG. 1 illustrates the overall system 10, while FIG. 2 focuses on components of system 10 related to quick-change clamp arm 20. As shown in FIG. 2, quick-change clamp arm 20 includes a clamp arm body 28, a first anchor pin 30 fixed to and extending from clamp arm body 28, and a second anchor pin 32 fixed to and extending from clamp arm body 28. First anchor pin 30 is configured to be selectively and reversibly connected to first quick-change feature 22 of robot end effector 18, such that quick-change clamp arm 20 may be removably coupled to robot end effector 18 via first anchor pin 30. Similarly, second anchor pin 32 is configured to be selectively and reversibly connected to a second quick-change feature 34 located apart from robot end effector 18. For example, second quick-change feature 34 may be coupled to storage structure 26.

As shown in FIG. 2, clamp arm body 28 includes a proximal end region 36 and a distal end region 38. First anchor pin 30 may be positioned within proximal end region 36 in some examples. Second anchor pin 32 may be positioned distal to first anchor pin 30 (e.g., second anchor pin 32 may be positioned between proximal end region 36 and distal end region 38, with second anchor pin 32 being closer to distal end region 38 than first anchor pin 30 is). In some examples, a curved portion 40 may be formed in clamp arm body 28, between proximal end region 36 and distal end region 38. In these examples, second anchor pin 32 may be positioned proximal to curved portion 40 (e.g., closer to proximal end region 36 than curved portion 40 is). In other words, second anchor pin 32 may be positioned between proximal end region 36 and curved portion 40.

In use, first quick-change feature 22 remains coupled to robot end effector 18 via clamp arm adapter 24, and second quick-change feature 34 remains coupled to storage rack 26. Quick-change clamp arm 20 may be selectively coupled to robot end effector 18 by engaging first anchor pin 30 with first quick-change feature 22, and removed from robot end effector 18 by disengaging first anchor pin 30 from first quick-change feature 22. Similarly, quick-change clamp arm 20 may be selectively coupled to storage rack 26 by engaging second anchor pin 32 with second quick-change feature 34, and removed from storage rack 26 by disengaging second anchor pin 32 from second quick-change feature 34. In this manner, robot 16 may quickly remove a respective quick-change clamp arm 20 from robot end effector 18, store it safely in storage rack 26, and engage a different respective quick-change clamp arm from within storage rack 26. In this manner, a single robot end effector 18 may utilize a plurality of different respective quick-change clamp arms 20 in system 10, such that a dedicated robot end effector 18 is not required for each respective quick-change clamp arm 20 of system 10. Systems 10 may be configured such that robot 16 may autonomously engage and remove a respective quick-change clamp arm 20, as well as autonomously place and retrieve respective quick-change clamp arms 20 to and from storage rack 26.

Clamp arm body 28 may include a pressure foot 42 (FIG. 2) configured to apply a normal force to workpiece 12 (indicated by dashed line 43 in FIG. 1) while robot end effector 18 performs an operation on workpiece 12 (indicated by dashed line 45 in FIG. 1). For example, while quick-change clamp arm 20 is coupled to robot end effector 18, pressure foot 42 may be configured to apply a normal force to a first side 44 of workpiece 12 while robot end effector 18 (e.g., a tool 70 of robot end effector 18) performs an operation on or to a second side 46 of workpiece 12. In these examples, quick-change clamp arm 20 is configured to pinch or sandwich a portion of workpiece 12 between pressure foot 42 and tool 70 of robot end effector 18. Pressure foot 42 is within distal end region 38 of clamp arm body 28, while quick-change clamp arm 20 is generally coupled to robot end effector 18 adjacent proximal end region 36 of clamp arm body 28 (e.g., first anchor pin 30 may be near or within proximal end region 36).

As used herein, pressure foot 42 may be said to apply a normal force to workpiece 12 even if pressure foot 42 does not directly contact workpiece 12. For example, a contact button 48 may be coupled to pressure foot 42, wherein contact button 48 is configured to convey the normal force from pressure foot 42 to workpiece 12 (e.g., contact button 48 may contact workpiece 12 rather than pressure foot 42 itself). Contact button 48 may be selectively removable from clamp arm body 28, and replaceable with a new respective contact button, such as if contact button 48 gets worn or damaged. In this manner, contact button 48 may be a somewhat disposable component in some examples, and may lengthen the lifespan of quick-change clamp arm 20.

Contact button 48 may be, for example, a flanged drill bushing, but many different structures are possible. Clamp arm body 28 may include a hole 50 configured to receive contact button 48 with a press-fit engagement between hole 50 and a portion of contact button 48. Pressure foot 42 and/or contact button 48 may be configured to ensure that a nose piece of robot end effector 18 is in contact with workpiece 12 at the start of a task robot 16 is configured to perform on workpiece 12. Accordingly, quick-change clamp arm 20 may be sized and shaped to access both the inside and outside of workpiece 12, while providing clearance from internal frames or other structures within workpiece 12.

Clamp arm body 28 generally includes an inner surface 52 and an outer surface 54 opposite inner surface 52. First anchor pin 30 may extend from inner surface 52, while second anchor pin 32 may extend from outer surface 54 of clamp arm body 28. First anchor pin 30 and second anchor pin 32 are generally fixedly attached to clamp arm body 28, such that first anchor pin 30 extends from clamp arm body 28 when quick-change clamp arm 20 is disengaged from first quick-change feature 22 of robot end effector 18, and such that second anchor pin 32 extends from clamp arm body 28 when quick-change clamp arm 20 is disengaged from second quick-change feature 34 of storage rack 26. For example, first anchor pin 30 and second anchor pin 32 may be secured to clamp arm body 28 via one or more respective cap screws.

Clamp arm body 28 may include one or more features configured to facilitate alignment of quick-change clamp arm 20 with a respective quick-change feature (e.g., first quick-change feature 22 and/or second quick-change feature 34). For example, clamp arm body 28 may include a first alignment hole 56 (FIG. 2) configured to receive a first alignment pin 58 of robot end effector 18 when quick-change clamp arm 20 is engaged with robot end effector 18. In some examples, first alignment hole 56 may be positioned adjacent first anchor pin 30. First alignment hole 56 may be proximal to or distal to first anchor pin 30. First alignment hole 56 may extend into quick-change clamp arm 20 from inner surface 52 of clamp arm body 28 in some examples. When first anchor pin 30 is engaged with first quick-change feature 22 of robot end effector 18 and first alignment pin 58 is positioned at least partially within first alignment hole 56, first alignment hole 56 and first alignment pin 58 may be configured to prevent rotation of clamp arm body 28 with respect to robot end effector 18, with respect to first quick-change feature 22, and/or with respect to clamp arm adapter 24 of robot end effector 18.

Additionally or alternatively, clamp arm body 28 may include a second alignment hole 60 configured to receive a second alignment pin 62 apart from robot end effector 18 (e.g., a second alignment pin 62 of storage rack 26). Second alignment hole 60 may be positioned adjacent second anchor pin 32. In some examples, second alignment hole 60 may be proximal to or distal to second anchor pin 32. Second alignment hole 60 may extend into clamp arm body 28 from outer surface 54 of clamp arm body 28. When second anchor pin 32 is engaged with second quick-change feature 34 and second alignment pin 62 is positioned at least partially within second alignment hole 60, second alignment hole 60 may be configured to prevent rotation of clamp arm body 28 with respect to second quick-change feature 34 and/or with respect to storage rack 26.

In some examples, rather than first and second alignment holes 56, 60 formed in clamp arm body 28 and first and second alignment pins 58, 62 extending near the respective quick-change features, clamp arm body 28 may include the alignment pins to be inserted into alignment holes formed near the respective quick-change features. In some examples, first and second alignment pins 58, 62 may be any shape of boss or projection, and need not be a pin in particular (e.g., first and/or second alignment pins 58, 62 may be non-cylindrical in some examples). Similarly, first and second alignment holes 56, 60 may be round holes in some examples, or may be non-round (e.g., elliptical, polygonal, oval, slotted, etc.) in some examples. Generally, however, first alignment pin 58 and first alignment hole 56 are shaped relative to one another such that first alignment pin 58 may be at least partially inserted within first alignment hole 56 when clamp arm body 28 is engaged with first quick-change feature 22, and second alignment pin 62 and second alignment hole 60 are shaped relative to one another such that second alignment pin 62 may be at least partially inserted within second alignment hole 60 when clamp arm body 28 is engaged with second quick-change feature 34.

First anchor pin 30 and second anchor pin 32 may be configured to engage with first quick-change feature 22 and second quick-change feature 34, respectively, in any suitable manner. In some examples, first anchor pin 30 includes a first groove 64 with which first quick-change feature 22 is configured to engage, and second anchor pin 32 includes a second groove 66 with which second quick-change feature 34 is configured to engage. First groove 64 and/or second groove 66 may be circumferential grooves in some examples. Additionally or alternatively, anchor pins 30, 32 may be configured to engage with quick-change features 22, 34 in other manners, and/or clamp arm body 28 may include a different structure or structures configured to be engaged with the respective quick-change features.

Robot end effector 18 generally includes tool 70 configured for performing a task on workpiece 12 (indicated by dashed line 45). Tool 70 may be located in a different location of robot end effector 18 than clamp arm adapter 24 (e.g., clamp arm adapter 24 may be spaced apart from a nose 72 or other region of robot end effector 18 having tool 70). In this manner, quick-change clamp arm 20 may be coupled to robot end effector 18 via clamp arm adapter 24 and first quick-change feature 22, adjacent proximal end region 36 of quick-change clamp arm 20, while distal end region 38 of clamp arm body 28 may be positioned near tool 70 in some examples. Accordingly, clamp arm adapter 24 is configured to position first quick-change feature 22 such that it is accessible to first anchor pin 30 of quick-change clamp arm 20. Thus, when quick-change clamp arm 20 is engaged with first quick-change feature 22, clamp arm adapter 24 positions and orients quick-change clamp arm 20 as desired for performing the task on workpiece 12 (e.g., quick-change clamp arm 20 may be oriented and positioned such that pressure foot 42 can apply a normal force to workpiece 12 while tool 70 performs a task on workpiece 12). System 10 may be configured such that tool 70 contacts workpiece 12 without gapping, prior to initiating performance of the task or operation on workpiece 12, by virtue of sandwiching workpiece 12 between tool 70 and quick-change clamp arm 20 (e.g., pressure foot 42 of quick-change clamp arm 20).

First quick-change feature 22 may be a pneumatically-operated clamp in some examples. Additionally or alternatively, first quick-change feature 22 may include a plurality of jaws 74 that open and close, thereby disengaging or engaging first anchor pin 30 (e.g., first groove 64 of first anchor pin 30), respectively. For example, plurality of jaws 74 may be configured to selectively move radially outward to disengage from first anchor pin 30, and configured to selectively move radially inward to engage first anchor pin 30 of quick-change clamp arm 20. Such engagement and disengagement between first quick-change feature 22 and first anchor pin 30 (thereby selectively engaging and disengaging quick-change clamp arm 20) may be automated in some systems 10. In one specific example, first quick-change feature 22 may be a commercially available clamp manufactured by SCHUNK GmbH & Co. KG (e.g., a "Schunk clamp"). Similarly, second quick-change feature 34 may be the same type of clamp or other device as first quick-change feature 22 in some systems 10. Suitable pins to serve as first anchor pin 30 and second anchor pin 32 are also available from SCHUNK GmbH & Co. KG, though other pins and variations are also suitable and within the scope of the present disclosure. In these examples, a respective plurality of jaws 74 of second quick-change feature 34 may be configured to selectively move radially outward to disengage from second anchor pin 32, and configured to selectively move radially inward to engage second anchor pin 32 of quick-change clamp arm 20. Such engagement and disengagement between second quick-change feature 34 and second anchor pin 32 (thereby selectively engaging and disengaging quick-change clamp arm 20) may be automated in some systems 10.

Robot end effector 18 and tool 70 may be any suitable type of end effector and tool. For example, robot end effector 18 may be a drill motor assembly in some systems 10. Tool 70 may include a drill, a gripper, a cutting tool, a deburring tool, a milling tool, a welding head, a spray gun, and/or a sensor. Robot end effector 18 may be configured to perform any suitable task, including drilling, countersinking, gripping, cutting, milling, deburring, welding, spraying, and/or sensing. In some examples, system 10 may be configured to perform a one-up assembly process, such as performing one or more tasks (e.g., drilling, inspecting, and/or fastening) without needing to remove components (e.g., disassembling a panel or portion of workpiece 12) for cleaning, deburring, and/or sealing. Robot 16 is generally configured to move robot end effector 18 and quick-change clamp arm 20 with respect to workpiece 12, in order to perform the task on workpiece 12.

Clamp arm body 28 may have any suitable shape for a given application. For example, clamp arm body 28 may be substantially C-shaped or substantially J-shaped. In some examples, clamp arm body 28 tapers in cross-sectional area from proximal end region 36 to distal end region 38 (e.g., the cross-sectional area of clamp arm body 28 may be greater within proximal end region 36 than within distal end region 38). In some examples, quick-change clamp arm 20 may be configured to be product-specific (e.g., designed for use in the manufacture of a single product or apparatus).

Systems 10 may include a plurality of different respective sizes of quick-change clamp arms 20. For example, system 10 may include a clamp arm set 76 comprising a plurality of quick-change clamp arms 20 of different sizes and/or shapes. In some examples, a specific distance 68 may separate first anchor pin 30 from second anchor pin 32 for each respective size of quick-change clamp arm 20. Additionally or alternatively, a different respective first distance 69 may separate second anchor pin 32 from second alignment hole 60 for each respective size of quick-change clamp arm 20. Robot 16 may be configured to detect the respective specific distance 68 and/or first distance 69 of each respective quick-change clamp arm 20 within storage rack 26 in order to determine the desired respective quick-change clamp arm 20.

A given first quick-change feature 22 of a respective robot end effector 18 is generally configured to be selectively and reversibly connected to at least two different respective quick-change clamp arms 20 having a plurality of different sizes and/or shapes, within system 10. In this manner, systems 10 may be configured to reduce the number of robot end effectors 18 within work cell 14, because system 10 does not require a respective robot end effector 18 for each respective quick-change clamp arm 20 used in a given task or process. Thus, systems 10 may increase flexibility of tasks and/or types of workpieces 12 suitable for work cell 14. Additionally or alternatively, systems 10 may reduce the floor space needed for a given work cell 14, reduce capital expenditure (e.g., by reducing the number of robot end effectors 18 in the work cell), allow simplification of programming routines for a given task or operation, increase safety, decrease time required to perform a given task or operation, an/or provide flexibility to use a given quick-change clamp arm 20 for multiple product lines.

Storage rack 26 may be configured to store the plurality of quick-change clamp arms 20 in clamp arm set 76, when not in use (e.g., while not coupled to the respective robot end effector 18 coupled to robot 16). Storage rack 26 may be configured to store at least two, at least three, at least four, at least five, at least six, at least seven, at least eight, at least nine, and/or at least ten respective quick-change clamp arms 20. For example, storage rack 26 comprises a plurality of second quick-change features 34, wherein each respective second quick-change feature 34 is configured to selectively and reversibly engage a respective second anchor pin 32 of a respective quick-change clamp arm 20, such that the respective quick-change clamp arm 20 is configured to be coupled to storage rack 26 via its respective second anchor pin 32 and the respective second quick-change feature 34.

Some systems 10 may include a plurality of different robot end effectors 18. For example, system 10 includes a first robot end effector 18 coupled to robot 16, a second robot end effector 18' stored in storage rack 26, and a third robot end effector 18" also stored in storage rack 26. Each respective robot end effector 18 may be configured to be selectively and reversibly coupled to one or more respective quick-change clamp arms 20 of system 10. In some systems 10, different respective robot end effectors 18 may be configured to perform different tasks, may be different sizes, may have different nose portions, and/or may have different tools coupled thereto. Additionally, each robot end effector 18 may be selectively removable from robot 16, such that a different respective robot end effector 18 (e.g., second robot end effector 18' or third robot end effector 18") may be selectively coupled to robot 16. Similarly to clamp arm set 76, storage rack 26 may be configured to store the plurality of robot end effectors 18 when not in use (e.g., when not coupled to robot 16 or another robot of system 10). Storage rack 26 may be configured to store at least two, at least three, at least four, at least five, at least six, at least seven, at least eight, at least nine, and/or at least ten respective robot end effectors 18.

Storage rack 26 may include a plurality of storage spaces 78, wherein each respective storage space 78 may be configured to receive a respective quick-change clamp arm 20 and/or a respective robot end effector 18. Each respective storage space 78 of storage rack 26 may include a respective second quick-change feature 34 for receiving a respective quick-change clamp arm 20. Each respective second quick-change feature 34 may be coupled to storage rack 26 via a respective base plate 80. For example, each respective storage space 78 of storage rack may include a respective base plate 80 (FIG. 2) with a respective second quick-change feature 34 coupled thereto. In some systems 10, each respective storage space 78 of storage rack 26 may be configured to receive a different respective size of quick-change clamp arm 20.

Additionally or alternatively, storage rack 26 may include a plurality of second alignment pins 62 each being configured to be positioned at least partially within a respective second alignment hole 60 of a respective quick-change clamp arm 20 when said quick-change clamp arm 20 is positioned on storage rack 26. Each second alignment pin 62 may be positioned adjacent and/or associated with a respective second quick-change feature 34. Second alignment pin 62 is configured to prevent rotation of the respective quick-change clamp arm 20 it is engaged with, with respect to storage rack 26 and/or with respect to second quick-change feature 34, when the respective second anchor pin 32 of the respective quick-change clamp arm 20 is coupled to the respective second quick-change feature 34.

In some systems 10, each respective second alignment pin 62 may extend outwardly from a respective storage mating surface 82. Storage mating surface 82 may be a surface of storage rack 26, may be a surface of base plate 80, or may be a different associated surface. Storage rack 26 may include a respective storage mating surface 82 adjacent each respective second quick-change feature 34. In some systems 10, each respective storage space 78 of storage rack 26 may include a respective pin block assembly 84, which may be formed integrally with or coupled to a respective base plate 80. In some examples, storage mating surface 82 may form a portion of pin block assembly 84 such that a respective second alignment pin 62 extends from each respective pin block assembly 84.

Storage rack 26 is generally configured such that each storage space 78 and any respective quick-change clamp arm 20 stored therein is accessible by robot 16 such that robot 16 may remove any given quick-change clamp arm 20 stored in storage rack 26 for use. Storage rack 26 may be multi-tiered (e.g., two-tiered, or having more than two tiers, or rows) in some systems 10. For example, storage rack 26 may be configured to store a plurality of quick-change clamp arms 20 (e.g., clamp arm set 76) in a first portion 86 of storage rack 26, and a plurality of robot end effectors 18 in a second portion 88 of storage rack 26. Some systems 10 may include more than one storage rack 26 (e.g., first storage rack 26 and second storage rack 26'). First storage rack 26 and second storage rack 26' may each be configured to store a plurality of quick-change clamp arms 20 and a plurality of robot end effectors 18 in some examples. In other examples, one of the storage racks may be configured to store a plurality of quick-change clamp arms 20, while the other storage rack may be configured to store a plurality of robot end effectors 18. Storage rack 26 is generally configured such that each respective quick-change clamp arm 20 and robot end effector 18 may be spaced apart from each other within storage rack 26.

Some systems 10 may include a second robot 16' within work cell 14. Second robot 16' may be configured to perform the same task or tasks as robot 16 in some examples. Additionally or alternatively, second robot 16' may be configured to perform a different task or tasks on or to workpiece 12. Systems 10 may include a plurality of quick-change clamp arms 20 (e.g., 2, 3, 5, 8, or 10 or more) for each respective robot 16 within system 10. Similarly, systems 10 may include a plurality of robot end effectors 18 for each respective robot 16.

Systems 10 may be configured for completely automated removal of a respective quick-change clamp arm 20 from the robot end effector 18 coupled to robot 16. Additionally or alternatively, systems 10 may be configured for completely automated placement of the removed quick-change clamp arm 20 into storage rack 26. Similarly, systems 10 may be configured for completely automated coupling of a different respective quick-change clamp arm 20 to robot end effector 18, such as by selecting said respective quick-change clamp arm from amongst a plurality of quick-change clamp arms located within storage rack 26.

Turning now to FIGS. 3-7, illustrative non-exclusive examples of systems 10 and quick-change clamp arms 20 illustrated. Where appropriate, the reference numerals from the schematic illustrations of FIGS. 1-2 are used to designate corresponding parts of the examples of FIGS. 3-7; however, the examples of FIGS. 3-7 are non-exclusive and do not limit quick-change clamp arms 20 or systems 10 to the illustrated embodiments of FIGS. 3-7. That is, systems 10 and quick-change clamp arms 20 are not limited to the specific embodiments of FIGS. 3-7, and may incorporate any number of the various aspects, configurations, characteristics, properties, etc. that are illustrated in and discussed with reference to the schematic representations of FIGS. 1-2 and/or the embodiments of FIGS. 3-7, as well as variations thereof, without requiring the inclusion of all such aspects, configurations, characteristics, properties, etc. For the purpose of brevity, each previously discussed component, part, portion, aspect, region, etc. or variants thereof may not be discussed, illustrated, and/or labeled again with respect to the examples of FIGS. 3-7; however, it is within the scope of the present disclosure that the previously discussed features, variants, etc. may be utilized with the examples of FIGS. 3-7.

Figure 3:
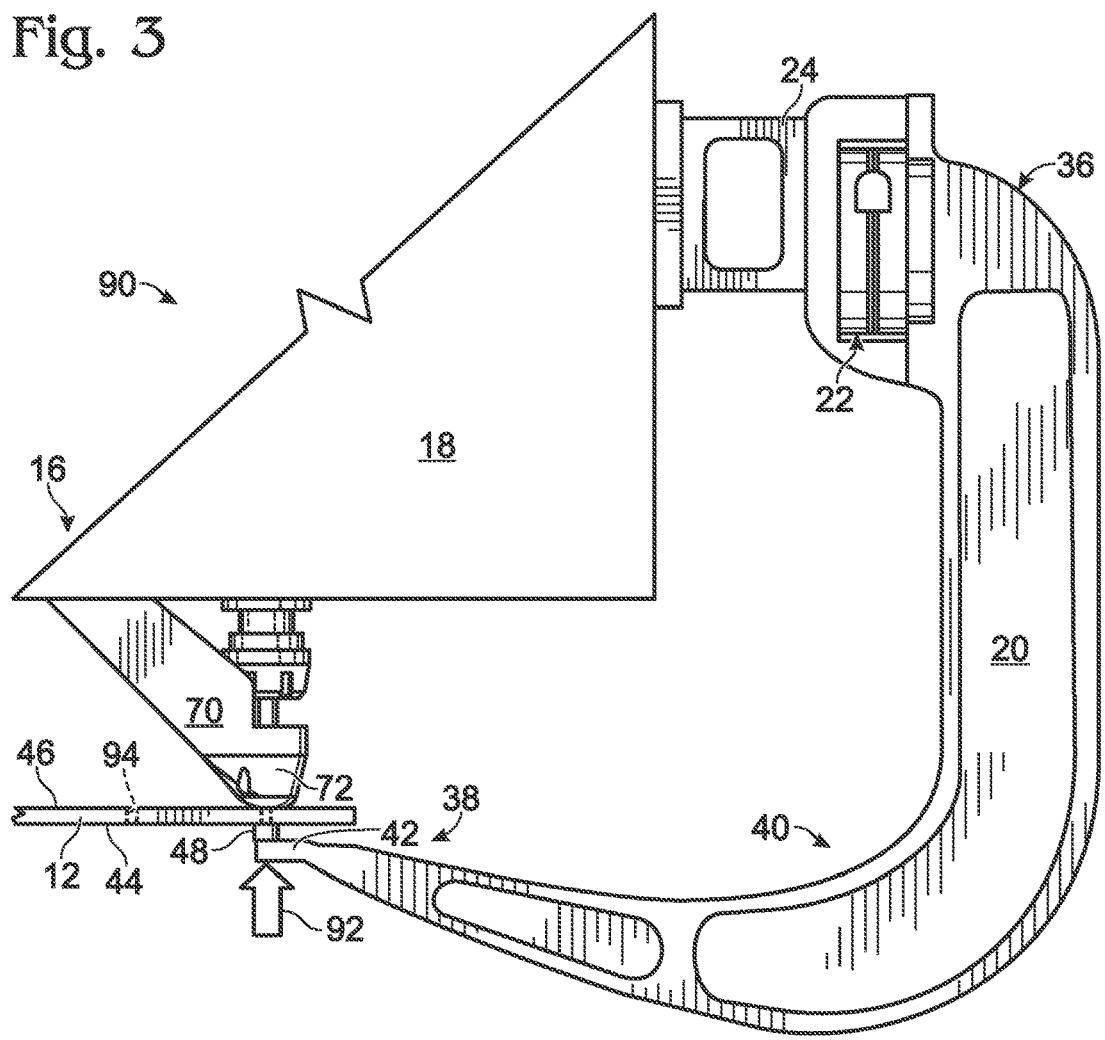
FIG. 3 is an elevation view of one example of a system according to the present disclosure, illustrating a robot end effector performing a task on a first side of a workpiece while a quick-change clamp arm applies a normal force to a second side of the workpiece.

FIG. 3 illustrates a system 90, which is an example of system 10. System 90 includes robot 16 with end effector 18 and quick-change clamp arm 20 coupled thereto via clamp arm adapter 24. The configuration shown in FIG. 3 illustrates robot 16, quick-change clamp arm 20, and robot end effector 18 in position with respect to workpiece 12, in order to perform a task on workpiece 12. Quick-change clamp arm 20 is positioned such that contact button 48 coupled to pressure foot 42 in distal end region 38 applies a normal force (indicated by arrow 92) to first side 44 of workpiece 12. Robot end effector 18 is arranged such that tool 70 may perform a task on second side 46 of workpiece 12. Tool 70 and contact button 48 (via pressure foot 42) are generally arranged directly opposite one another, as shown in FIG. 3, though there may be a slight offset in some examples. Tool 70 may be configured to, for example, drill one or more holes 94 in workpiece 12 and/or secure one or more fasteners (e.g., a rivet) to workpiece 12. Pressure foot 42 of quick-change clamp arm 20 is generally configured to counteract the forces applied by tool 70 to workpiece 12, to stabilize workpiece 12 while robot 16 performs the task.

FIG. 4 illustrates a system 96 (which is one example of system 10), including robot end effector 18, with an example of quick-change clamp arm 20 coupled thereto via clamp arm adapter 24. Robot end effector 18 and quick-change clamp arm 20 are shown separated from a robot (e.g., robot 16) in FIG. 4, for ease of viewing. Quick-change clamp arm 20 is coupled to clamp arm adapter 24 in proximal end region 36 of quick-change clamp arm 20. In system 96, quick-change clamp arm 20 tapers in cross-sectional area from proximal end region 36 to distal end region 38. The shape of quick-change clamp arm 20 (e.g., having curved portion 40) allows for distal end region 38 (including pressure foot 42 and contact button 48) to be in relatively close proximity to tool 70 and/or nose portion 72 of robot end effector 18 when quick-change clamp arm 20 is secured to robot end effector 18. Second anchor pin 32 extends from outer surface 54 of quick-change clamp arm 20, between proximal end region 36 and curved portion 40 in this example. Second anchor pin 32 may be utilized to couple quick-change clamp arm 20 elsewhere when quick-change clamp arm 20 is removed from robot end effector 18. For example, quick-change clamp arm 20 may be coupled to second quick-change feature 34 in storage rack 26 (FIG. 1) via second anchor pin 32. While not visible in FIG. 4, first anchor pin 30 of quick-change clamp arm 20 is coupled to first quick-change feature 22 of robot end effector 18, as will be described in further detail with respect to FIG. 5.

Figure 5:
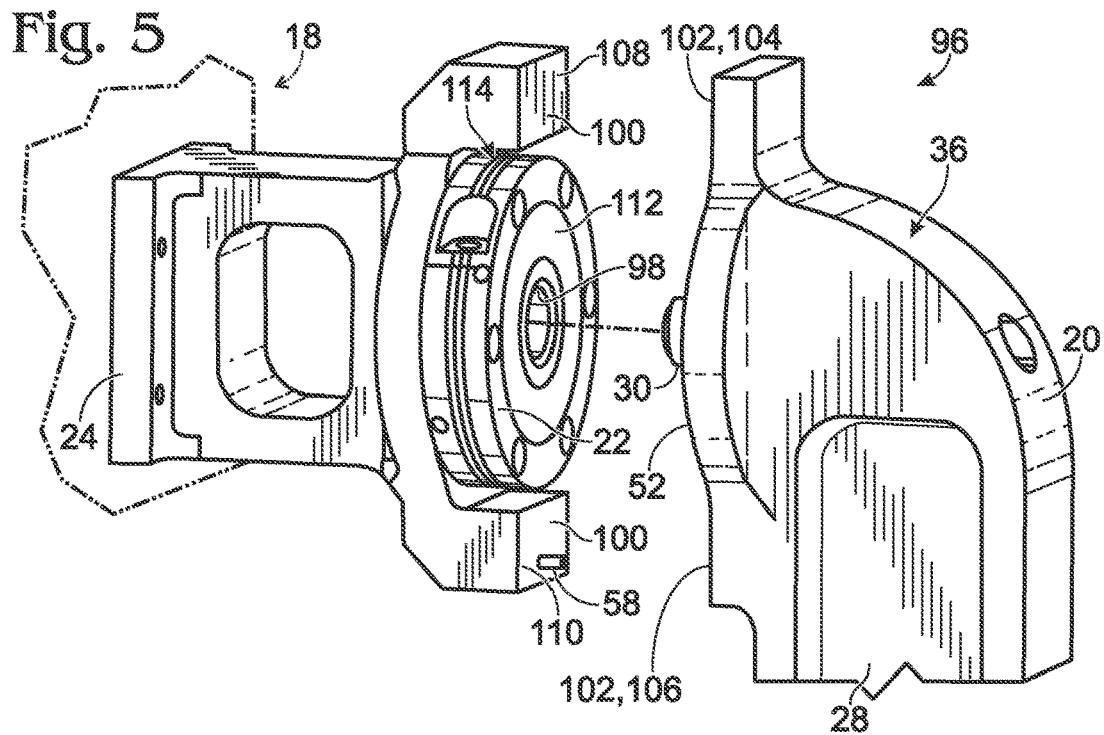
FIG. 5 is a close-up elevation view of one example of a quick-change clamp arm being coupled to a clamp arm adapter of a robot end effector via a first quick-change feature, according to the present disclosure.

FIG. 5 illustrates a close-up view of a portion of system 96 from FIG. 4, with quick-change clamp arm 20 decoupled from first quick-change feature 22 (and thereby decoupled from robot end effector 18). First anchor pin 30 extends from inner surface 52 of quick-change clamp arm 20 in proximal end region 36. To couple quick-change clamp arm 20 to robot end effector 18 as shown in FIG. 4, first anchor pin 30 may be engaged with (e.g., coupled to) quick-change feature 22, such as by inserting first anchor pin 30 into a central hole 98 of first quick-change feature 22. First quick-change feature 22 may then clamp on to or otherwise engage first anchor pin 30 (e.g., first groove 64 of first anchor pin 30), such as by clamping one or more pneumatically operated features (e.g., jaws 74 of FIG. 2) about first anchor pin 30.

System 96 also includes first alignment pin 58 extending from clamp arm adapter 24 of robot end effector 18. Said first alignment pin 58 may be inserted at least partially into first alignment hole 56 formed in clamp arm body 28 of quick-change clamp arm 20 (e.g., extending into clamp arm body 28 from inner surface 52). Such insertion of first alignment pin 58 into first alignment hole 56 as quick-change clamp arm 20 is coupled to first quick-change feature 22 is configured to prevent rotation of quick-change clamp arm 20 with respect to clamp arm adapter 24 and robot end effector 18. System 96 is illustrated with a cylindrical first alignment pin 58 and a round first alignment hole 56, but other shapes are possible. First alignment hole 56 may be any shape, such as elliptical, polygonal, oval, slotted, and etc., and first alignment pin 58 may be any correspondingly-shaped boss that is configured to engage with (e.g., be inserted at least partially in to) first alignment hole 56.

Clamp arm adapter 24 may include an adapter mating surface 100 adjacent first quick-change feature 22 that is configured to engage a first clamp arm mating surface 102 when quick-change clamp arm 20 is coupled to first quick-change feature 22. First clamp arm mating surface 102 may be a portion of inner surface 52 of clamp arm body 28. First clamp arm mating surface 102 may be configured to correspond to adapter mating surface 100 (e.g., said surfaces may have similar shapes and/or profiles, as best seen in FIG. 5). In some examples, first clamp arm mating surface 102 may include a proximal clamp arm mating surface 104 proximal to first anchor pin 30 and a distal clamp arm mating surface 106 distal to first anchor pin 30. Said proximal clamp arm mating surface 104 may engage a first portion 108 of adapter mating surface 100 (also referred to herein as a first adapter mating surface 108) when quick-change clamp arm 20 is coupled to first quick-change feature 22. Similarly, said distal clamp arm mating surface 106 may engage a second portion 110 of adapter mating surface 100 (also referred to herein as a second adapter mating surface 110) when quick-change clamp arm 20 is coupled to first quick-change feature 22. When quick-change clamp arm 20 is coupled to first quick-change feature 22, first clamp arm mating surface 102 generally is in contact with adapter mating surface 100, though there may be intermediate coatings or structures between the two in some examples. Adapter mating surface 100 may be substantially parallel to an outer feature surface 112 of quick-change feature 22, as shown in FIG. 5.

In some examples, and as shown in FIG. 5, first portion 108 of adapter mating surface 100 may be proximal to first quick-change feature 22 and second portion 110 of adapter mating surface 100 may be distal to first quick-change feature 22, though other arrangements are also possible. For example, adapter mating surface 100 may be rotated with respect to the arrangement shown in FIG. 5 in some examples. In some examples, adapter mating surface 100 may extend around a periphery 114 of quick-change feature 22, or around a greater portion of periphery 114 than shown in FIG. 5. First alignment pin 58 may extend from adapter mating surface 100 in some examples (e.g., from second portion 110 of adapter mating surface 100 as shown in FIG. 5). Additionally or alternatively, first alignment pin 58 may extend from another portion of clamp arm adapter 24, from another portion of adapter mating surface 100, and/or from another portion of robot end effector 18. Additionally or alternatively, first alignment pin 58 may be located adjacent first quick-change feature 22. In some examples, clamp arm adapter 24 may include a plurality of first alignment pins 58, and quick-change clamp arm 20 may include a corresponding plurality of respective first alignment holes 56.

Figure 7:
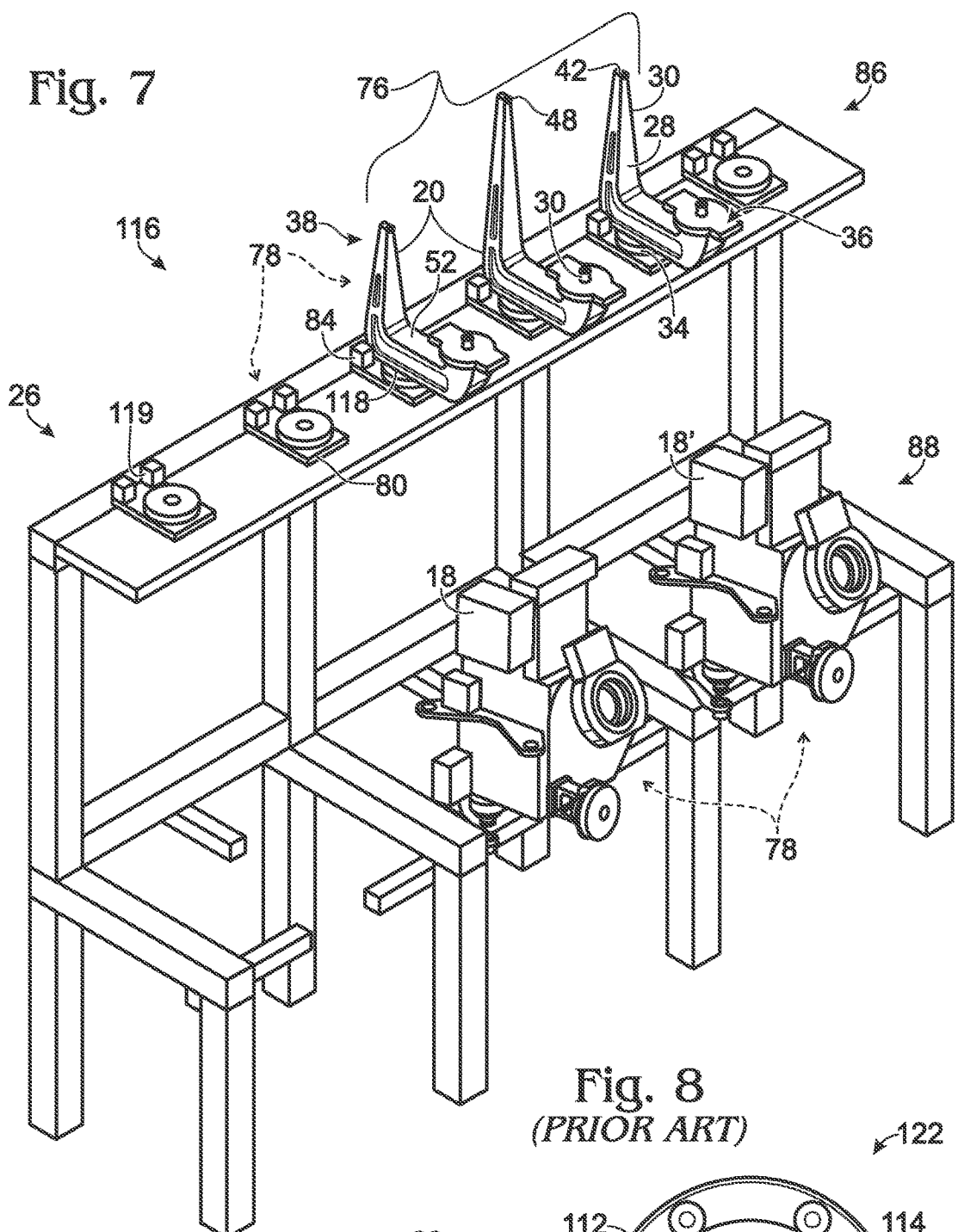
FIG. 7 is a simplified perspective view of one example of a storage rack having a plurality of quick-change clamp arms and robot end effectors stored therein.

FIGS. 6-7 illustrate a portion of a system 116, which is an example of system 10. FIG. 6 shows a close-up view of a portion of quick-change clamp arm 20 in the process of being coupled to, but still separated from a second quick-change feature 34 in a storage space 78 of storage rack 26, while FIG. 7 shows quick-change clamp arm 20 engaged with (e.g., coupled to) second quick-change feature 34 and thus stored within storage rack 26. As best seen in FIG. 6, second anchor pin 32 may be placed into a central hole 98 of second quick-change feature 34 and secured thereto, such as by engaging second groove 66 of second anchor pin 32 by closing a plurality of jaws 74 about second anchor pin 32. As second anchor pin 32 is so engaged with second quick-change feature 34, second alignment pin 62 (which may be positioned adjacent second quick-change feature 34) may be at least partially inserted into second alignment hole 60 of clamp arm body 28 (best seen in FIG. 4). Engagement of second alignment pin 62 with second alignment hole 60 may prevent rotation of quick-change clamp arm 20 with respect to storage structure 26 and with respect to second quick-change feature 34 when quick-change clamp arm 20 is engaged with second quick-change feature 34 (e.g., when quick-change clamp arm 20 is removed from robot end effector 18 and placed in storage rack 26). System 116 is illustrated with a cylindrical second alignment pin 62 and a round second alignment hole 60, but other shapes are possible. Second alignment hole 60 may be any shape, such as elliptical, polygonal, oval, slotted, and etc., and second alignment pin 62 may be any correspondingly-shaped boss that is configured to engage with (e.g., be inserted at least partially in to) second alignment hole 60.

Quick-change clamp arm 20 may include a second clamp arm mating surface 118, which may form a part of outer surface 54 of clamp arm body 28 (as best seen in FIG. 4), that is configured to contact and/or engage a corresponding storage mating surface 82 adjacent second quick-change feature 34. Storage rack 26 may include a plurality of storage mating surfaces 82, such as a respective storage mating surface 82 for each respective storage space 78. In this manner, a respective second clamp arm mating surface 118 of a plurality of respective quick-change clamp arms 20 may be stored in storage structure 26 such that each respective second clamp arm mating surface 118 contacts a respective storage mating surface 82 when the respective second anchor pin 32 is engaged with the respective second quick-change feature 34.

In some examples, storage mating surface 82 may be substantially parallel to outer feature surface 112 of second quick-change feature 34. Each respective second quick-change feature 34 may be coupled to storage rack 26 via a respective base plate 80 and/or a respective pin block assembly 84. Storage mating surface 82 and second alignment pin 62 extending therefrom may form a part of pin block assembly 84 in some examples. In some examples, each respective pin block assembly 84 may include one or more respective vertical mating surfaces 119 that are at least substantially perpendicular to the respective storage mating surface 82 of the respective pin block assembly 84. Vertical mating surfaces 119 may be configured to contact and stabilize a respective quick-change clamp arm 20 such that quick-change clamp arm 20 may remain upright and stable while secured to second quick-change feature 34.

Storage rack 26 of system 96 is configured to store a plurality of quick-change clamp arms 20 (e.g., a clamp arm set 76) in first portion 86 of storage rack 26, and a plurality of robot end effectors 18 in second portion 88 of storage rack 26. As illustrated, storage rack 26 is multi-tiered (e.g., two-tiered, with first portion 86 corresponding to a first tier, or row, and second portion 88 corresponding to a second tier, or row). In other examples, storage rack 26 may have more or fewer tiers, and/or first portion 86 may be correspond to a portion of one or more tiers of storage rack 26, and/or second portion 88 may correspond to a portion of one or more tiers of storage rack 26. In some examples, each respective quick-change clamp arm 20 of clamp arm set 76 has a different respective first distance 69 between its respective second anchor pin 32 and its respective second alignment hole 60. Accordingly, each respective storage space 78 of storage rack 26 may be arranged to have a different respective second distance 120 (FIG. 6) separating central hole 98 of the respective second quick-change feature 34 from the respective second alignment pin 62. Each respective second distance 120 may correspond to a respective first distance 69 of a respective quick-change clamp arm 20 of clamp arm set 76, such that each respective quick-change clamp arm 20 has a designated storage space 78 within storage rack 26. Thus, each respective quick-change clamp arm 20 within clamp arm set 76 may be configured to be placed in a different respective storage space 78 when the respective quick-change clamp arm 20 is not coupled to robot end effector 18, based on the respective first distance 69 of the respective quick-change clamp arm 20 and the respective second distance 120 of the respective storage space 78 of storage rack 26.

Figure 8:
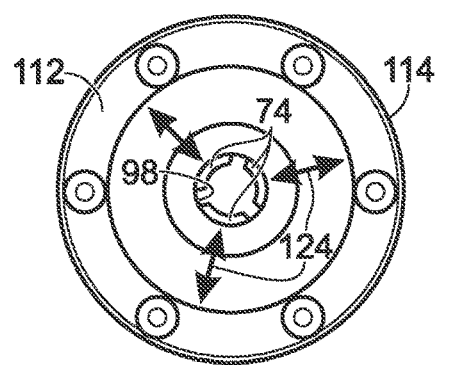
FIG. 8 is a plan view of a prior art clamp that may be utilized as a quick-change feature in presently disclosed systems.

FIG. 8 illustrates a pneumatically-operated clamp 122 (also referred to herein as "clamp 122"), which is an example of a suitable quick-change feature that may be used as first quick-change feature 22 and/or second quick-change feature 34 in presently disclosed systems 10. FIG. 8 illustrates a plan view of clamp 122 having outer surface 112, periphery 114, and central hole 98 extending through clamp 122. Clamp 122 includes a plurality of movable jaws 74 that may be selectively moved radially inward and outward (as indicated by arrows 124) in order to engage or disengage an anchor pin of a presently disclosed quick-change clamp arm.

Figure 9:
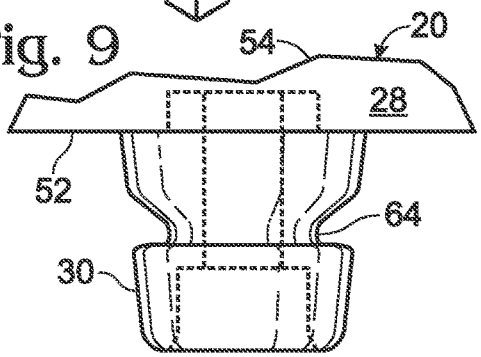
FIG. 9 is an elevation view of a portion of a quick-change clamp arm according to the present disclosure.

For example, FIG. 9 illustrates a cross-sectional view of first anchor pin 30 of quick-change clamp arm 20. First anchor pin 30 includes first groove 64, in the form of a circumferential indentation formed in the pin. Clamp 122 may be, for example, coupled to a robot end effector (e.g., robot end effector 18), thereby serving as first quick-change feature 22 of system 10, as described above. Jaws 74 of clamp 122 may be moved radially inward as first anchor pin 30 is inserted into central hole 98 of clamp 122, until jaws 74 engage first groove 64, thereby engaging first anchor pin 30 and coupling quick-change clamp arm 20 to the robot end effector. Similarly, jaws 74 of clamp 122 may be moved radially outward to disengage from first groove 64 of first anchor pin 30, thereby releasing first anchor pin 30 so that it can be removed from central hole 98 of clamp 122, thereby decoupling quick-change clamp arm 20 from the robot end effector.

Figure 10:
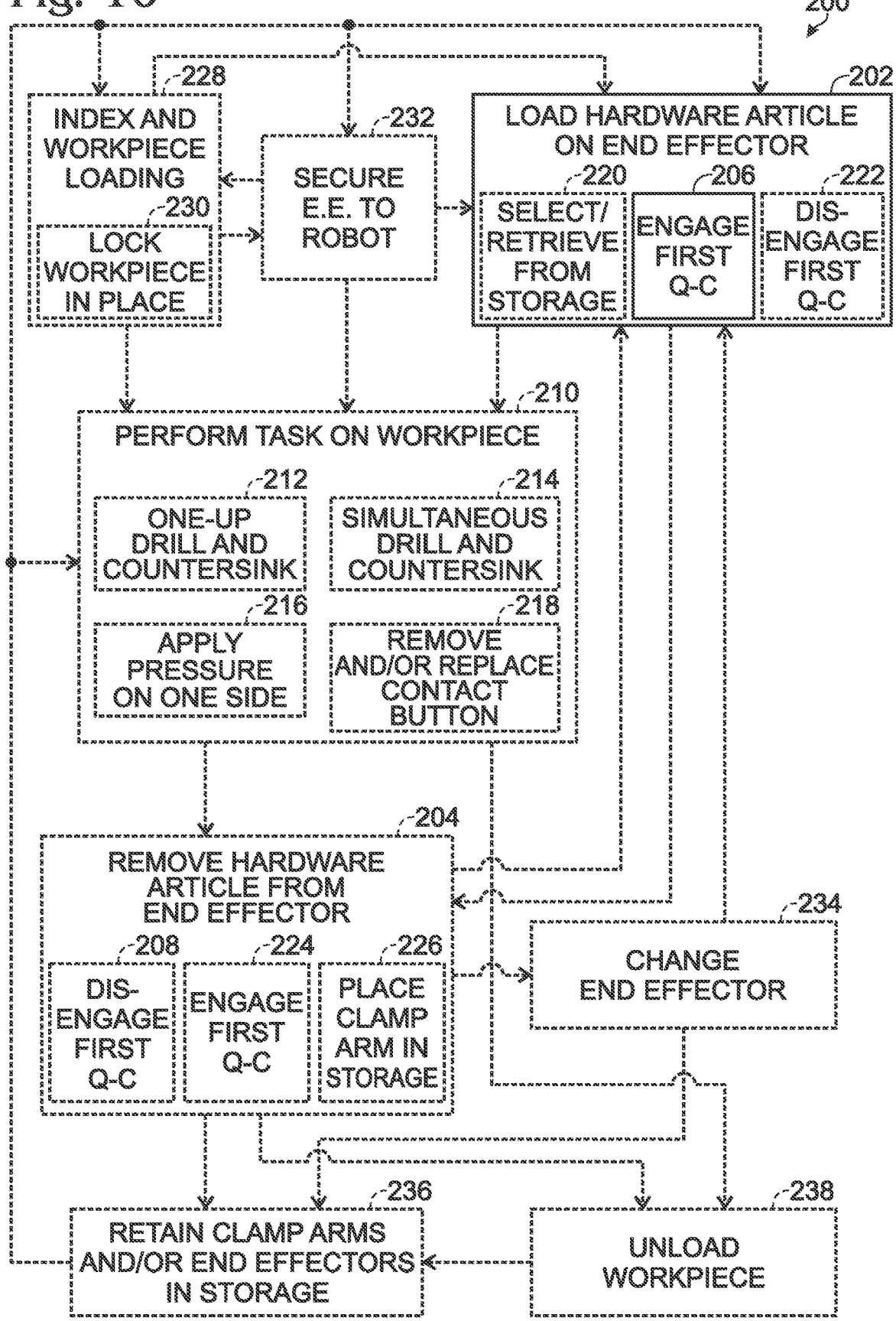
FIG. 10 is a flowchart schematically representing methods according to the present disclosure.

FIG. 10 schematically provides a flowchart that represents illustrative, non-exclusive examples of methods 200 according to the present disclosure. In FIG. 10, some steps are illustrated in dashed boxes indicating that such steps may be optional or may correspond to an optional version of a method according to the present disclosure. That said, not all methods according to the present disclosure are required to include the steps illustrated in solid boxes. The methods and steps illustrated in FIG. 10 are not limiting and other methods and steps are within the scope of the present disclosure, including methods having greater than or fewer than the number of steps illustrated, as understood from the discussions herein.

Generally, methods 200 include coupling a hardware article to a robot end effector (e.g., robot end effector 18) using a quick-change feature (e.g., first quick-change feature 22) at 202, and removing the hardware article from the robot end effector at 204. Said hardware article may be any suitable hardware article, but in some methods, the hardware article may be a clamp arm, such as quick-change clamp arm 20 described above in association with systems 10. Coupling the hardware article to the robot end effector at 202 includes engaging a first quick-change feature coupled to the robot end effector at 206, such as by inserting a portion of the hardware article into the first quick-change feature (e.g., inserting first anchor pin 30 into first quick-change feature 22). Similarly, removing the hardware article from the robot end effector at 204 includes disengaging the hardware article from the first quick-change feature at 208 (e.g., removing first anchor pin 30 from first quick-change feature 22, thereby releasing quick-change clamp arm 20 from robot end effector 18).

Methods 200 also may include performing a task on a workpiece (e.g., workpiece 12) using the hardware article at 210 after the hardware article is coupled to the robot end effector at 202. After the performing the task at 210, the hardware article may be removed at 204 and switched out for a different hardware article in some examples. Performing the task on the workpiece at 210 may include performing multiple tasks or operations on the workpiece in some examples. For example, performing the task at 210 may include forming a plurality of holes in the workpiece. In various methods 200, performing the task at 210 may include performing a one-up drill and countersink operation at 212, simultaneously drilling and countersinking at 214, and/or applying a stabilizing normal force to one side of the workpiece at 216 using the hardware article while a tool of the robot end effector performs the task on the other side of the workpiece. In some examples, a portion of the hardware article may be replaced as part of performing the task at 210.

For example, a contact button (e.g., contact button 48) may be removed from the hardware article (e.g., removed from pressure foot 42 of quick-change clamp arm 20) and replaced with a new contact button at 218, such as when the contact button gets worn or damaged from use.

In some methods 200, removing the hardware article at 204 comprises removing a first hardware article from the robot end effector, and coupling the hardware article at 202 comprises coupling a second hardware article to the robot end effector. In this manner, loading the hardware article at 202 and removing the hardware article at 204 may be performed repeatedly, in an alternating fashion, in order to switch out various hardware articles, such that when one hardware article is removed from the robot end effector, a different hardware article may be coupled to the robot end effector, in place of the first hardware article. For example, one of a plurality of quick-change clamp arms in a clamp arm set (e.g., clamp arm set 76) may be coupled to the robot end effector at 202, used to perform a task at 210, removed from the robot end effector at 204, and a different respective quick-change clamp arm from the clamp arm set may then be coupled to the robot end effector at 202, and used to perform another task at 210, and so on. Due to the quick-change nature of the presently disclosed systems, such removal and coupling of hardware articles to the robot end effector may be automated, thereby allowing use of systems where a single robot end effector may be used with a plurality of different hardware articles (e.g., quick-change clamp arms 20).

In some examples, loading the hardware article on a robot end effector at 202 includes selecting and retrieving a respective hardware article from storage at 220, such as by selecting and retrieving a respective quick-change clamp arm 20 from amongst a plurality of such quick-change clamp arms (e.g., clamp arm set 76) stored in a storage rack (e.g., storage rack 26). Additionally or alternatively, loading the hardware article on the robot end effector at 202 may include disengaging the hardware article from a second quick-change feature (e.g., second quick-change feature 34) at 222, which may be performed before, during, or after engaging the hardware article with the first quick-change feature at 206. For example, a respective second quick-change feature may be used to couple each respective quick-change clamp arm to the storage structure, and the quick-change clamp arm may be decoupled from the storage rack by disengaging the second quick-change feature at 222 as it is coupled to the robot end effector by engaging the first quick-change feature at 206. Similarly, removing the hardware article from the robot end effector at 204 may include engaging the second quick-change feature apart from the robot end effector at 224 and/or placing the hardware article in a storage rack at 226 as it is removed from the robot end effector at 204. For example, placing the hardware article in the storage rack at 226 may include placing the hardware article into a specific space (e.g., storage space 78) of the storage rack and coupling the hardware article to a respective second quick-change feature located therein. Said placing the hardware article into the storage rack at 226 may be performed before, after, or contemporaneously with the removing the hardware article from the robot end effector at 204. In some methods 200, the placing the hardware article into storage at 226 may include placing the hardware article into a pre-determined storage space among a plurality of storage spaces within the storage rack, based on the size of the hardware article.

Methods 200 may be performed within a work cell (e.g., work cell 14) in which the workpiece is located. Some methods 200 include positioning the workpiece in the work cell. For example, the workpiece may be indexed and loaded into position within the work cell at 228. In some examples, loading the workpiece into position at 228 may include locking or otherwise securing the workpiece in place at 230 such that the position and orientation of the workpiece remains substantially stable as the task is performed on the workpiece at 210. In some examples, the workpiece may be a structure or component of an aircraft.

Some methods 200 may include coupling a robot end effector to a robot (e.g., robot 16 configured to perform the task on the workpiece at 210) at 232, which generally may be performed before the loading the hardware article onto the robot end effector at 202. Additionally or alternatively, some methods 200 may include changing the robot end effector a 234, such as by removing a first robot end effector coupled to the robot and coupling a second robot end effector to the robot. In some examples, the storage rack may be configured to store a plurality of robot end effectors and the robot may be configured to remove a first respective end effector at 234, place it into the storage rack, and secure a second respective end effector to the robot at 232. Accordingly, the storage rack may retain a plurality of hardware articles and/or a plurality of robot end effectors at 236. After desired tasks are performed on the workpiece at 210, the workpiece may be unloaded at 238 and/or removed from the work cell. Then a second respective workpiece may be loaded at 228 and may steps of methods 200 may be repeated as desired on the second workpiece, and so on.

Illustrative, non-exclusive examples of inventive subject matter according to the present disclosure are described in the following enumerated paragraphs:

A1. A quick-change clamp arm for use with a robot end effector, the quick-change clamp arm comprising:
    a clamp arm body, comprising:
    a proximal end region; and
    a distal end region;
    a first anchor pin fixed to and extending from the clamp arm body, the first anchor pin being configured to be selectively and reversibly connected to a first quick-change feature of the robot end effector, such that the quick-change clamp arm is configured to be removably coupled to the robot end effector via the first anchor pin; and
    a second anchor pin fixed to and extending from the clamp arm body, the second anchor pin being configured to be selectively and reversibly connected to a second quick-change feature apart from the robot end effector.

A2. The quick-change clamp arm of paragraph A1, wherein the first anchor pin is positioned within the proximal end region of the clamp arm body.

A3. The quick-change clamp arm of any of paragraphs A1-A2, wherein the second anchor pin is positioned between the proximal end region of the clamp arm body and the distal end region of the clamp arm body.

A4. The quick-change clamp arm of any of paragraphs A1-A3, wherein the clamp arm body further comprises a pressure foot configured to apply a normal force to a workpiece while the robot end effector performs an operation on the workpiece.

A4.1. The quick-change clamp arm of paragraph A4, wherein the clamp arm body further comprises a contact button coupled to the pressure foot, wherein the contact button is configured to convey the normal force from the pressure foot to the workpiece.

A4.2. The quick-change clamp arm of paragraph A4.1, wherein the contact button is selectively removable from the clamp arm body, and replaceable with a new respective contact button.

A4.3. The quick-change clamp arm of any of paragraphs A4.1-A4.2, wherein the contact button comprises a flanged drill bushing.

A4.4. The quick-change clamp arm of any of paragraphs A4.1-A4.3, wherein the clamp arm body is configured such that the contact button directly contacts the workpiece.

A4.5. The quick-change clamp arm of any of paragraphs A4.1-A4.4, wherein the pressure foot comprises a hole configured to receive the contact button with a press-fit engagement between the hole and a portion of the contact button.

A4.6. The quick-change clamp arm of any of paragraphs A4.1-A4.5, wherein the pressure foot is configured to ensure that a nose piece of the robot end effector is in contact with the workpiece at the start of a task the robot end effector is configured to perform on the workpiece.

A5. The quick-change clamp arm of any of paragraphs A4-A4.6, wherein the pressure foot is within the distal end region of the clamp arm body.

A6. The quick-change clamp arm of any of paragraphs A4-A5, wherein the pressure foot is configured to apply a normal force to a first side of the workpiece while the robot end effector performs an operation to a second side of the workpiece, and while the quick-change clamp arm is coupled to the robot end effector.

A7. The quick-change clamp arm of any of paragraphs A1-A6, wherein the first anchor pin extends from an inner surface of the clamp arm body.

A8. The quick-change clamp arm of any of paragraphs A1-A7, wherein the second anchor pin extends from an outer surface of the clamp arm body.

A8.1. The quick-change clamp arm of paragraphs A7 and A8, wherein the inner surface is opposite the outer surface.

A9. The quick-change clamp arm of any of paragraphs A1-A8, wherein the clamp arm body comprises a curved portion between the proximal end region and the distal end region.

A9.1. The quick-change clamp arm of paragraph A9, wherein the second anchor pin is positioned proximal to the curved portion.

A9.2. The quick-change clamp arm of paragraph A9 or A9.1, wherein the second anchor pin is positioned between the proximal end region of the clamp arm body and the curved portion of the clamp arm body.

A10. The quick-change clamp arm of any of paragraphs A1-A9.2, wherein the quick-change clamp arm is substantially C-shaped.

A11. The quick-change clamp arm of any of paragraphs A1-A9.2, wherein the quick-change clamp arm is substantially J-shaped.

A12. The quick-change clamp arm of any of paragraphs A1-A11, wherein the quick-change clamp arm tapers in cross-sectional area from the proximal end region to the distal end region.

A13. The quick-change clamp arm of any of paragraphs A1-A11, wherein the quick-change clamp arm is configured to be selectively and removably coupled to a storage rack via the second anchor pin and the second quick-change feature.

A14. The quick-change clamp arm of any of paragraphs A1-A13, wherein the quick-change clamp arm is configured to be selectively coupled to the robot end effector by engaging the first anchor pin and the first quick-change feature with each other via an automated system.

A15. The quick-change clamp arm of any of paragraphs A1-A14, wherein the quick-change clamp arm is configured to be selectively removed from the robot end effector by disengaging the first anchor pin from the first quick-change feature via an/the automated system.

A16. The quick-change clamp arm of any of paragraphs A1-A15, wherein the quick-change clamp arm is configured to be selectively coupled to a/the storage rack by engaging the second anchor pin and the second quick-change feature with each other via an/the automated system.

A17. The quick-change clamp arm of any of paragraphs A1-A16, wherein the quick-change clamp arm is configured to be selectively coupled to a/the storage rack by disengaging the second anchor pin from the second quick-change feature via an/the automated system.

A18. The quick-change clamp arm of any of paragraphs A1-A17, wherein the quick-change clamp arm is configured to be product-specific, for use with a single product.

A19. The quick-change clamp arm of any of paragraphs A1-A18, wherein the first anchor pin extends from the clamp arm body when the first anchor pin is disengaged from the first quick-change feature of the robot end effector.

A20. The quick-change clamp arm of any of paragraphs A1-A19, wherein the first anchor pin is secured to the quick-change clamp arm using a first cap screw.

A21. The quick-change clamp arm of any of paragraphs A1-A20, wherein the second anchor pin is secured to the quick-change clamp arm using a second cap screw.

A22. The quick-change clamp arm of any of paragraphs A1-A21, wherein the second anchor pin extends from the clamp arm body when the second anchor pin is disengaged from the second quick-change feature.

A23. The quick-change clamp arm of any of paragraphs A1-A22, wherein the second anchor pin extends from the clamp arm body when the first anchor pin is engaged with the first quick-change feature of the robot end effector.

A24. The quick-change clamp arm of any of paragraphs A1-A23, wherein the first anchor pin extends from the clamp arm body when the second anchor pin is engaged with the second quick-change feature.

A25. The quick-change clamp arm of any of paragraphs A1-A24, further comprising a first alignment hole configured to receive a first alignment pin of the robot end effector.

A25.1. The quick-change clamp arm of paragraph A25, wherein the first alignment hole is positioned distal to the first anchor pin.

A25.2. The quick-change clamp arm of paragraphs A25 or A25.1, wherein the first alignment hole extends into the quick-change clamp arm from a/the inner surface of the clamp arm body.

A25.3. The quick-change clamp arm of any of paragraphs A25-A25.2, wherein the first alignment hole is configured to prevent rotation of the clamp arm body with respect to the robot end effector when the first anchor pin is engaged with the first quick-change feature of the robot end effector and the first alignment pin is positioned at least partially within the first alignment hole.

A25.4. The quick-change clamp arm of any of paragraphs A25-A25.3, wherein the first alignment hole is configured to prevent rotation of the clamp arm body with respect to the first quick-change feature when the first anchor pin is engaged with the first quick-change feature of the robot end effector and the first alignment pin is positioned at least partially within the first alignment hole.

A26. The quick-change clamp arm of any of paragraphs A1-A25.4, further comprising a second alignment hole configured to receive a second alignment pin apart from the robot end effector.

A26.1. The quick-change clamp arm of paragraph A26, wherein the second alignment hole is positioned distal to the second anchor pin.

A26.2. The quick-change clamp arm of paragraphs A26 or A26.1, wherein the second alignment hole extends into the quick-change clamp arm from a/the outer surface of the clamp arm body.

A26.3. The quick-change clamp arm of any of paragraphs A26-A26.2, wherein the second alignment hole is configured to prevent rotation of the clamp arm body with respect to a/the storage rack when the second anchor pin is engaged with the second quick-change feature apart from the robot end effector and the second alignment pin is positioned at least partially within the second alignment hole.

A26.4. The quick-change clamp arm of any of paragraphs A26-A26.3, wherein the second alignment hole is configured to prevent rotation of the clamp arm body with respect to the second quick-change feature when the second anchor pin is engaged with the second quick-change feature and the second alignment pin is positioned at least partially within the second alignment hole.

A27. The quick-change clamp arm of any of paragraphs A1-A26.4, wherein the quick-change clamp arm comprises at least one first clamp arm mating surface configured to contact a corresponding adapter mating surface adjacent the first quick-change feature of the robot end effector.

A27.1. The quick-change clamp arm of any of paragraphs A1-A27, wherein the quick-change clamp arm comprises at least one second clamp arm mating surface configured to contact a corresponding storage mating surface adjacent a second quick-change feature of a storage rack.

A28. The quick-change clamp arm of paragraph A27, wherein the at least one first clamp arm mating surface comprises a proximal clamp arm mating surface proximal to the first anchor pin and a distal clamp arm mating surface distal to the first anchor pin.

A29. The quick-change clamp arm of any of paragraphs A1-A28, wherein the first anchor pin comprises a first groove with which the first quick-change feature is configured to engage.

A30. The quick-change clamp arm of paragraph A29, wherein the first groove is circumferential.

A31. The quick-change clamp arm of any of paragraphs A1-A30, wherein the second anchor pin comprises a second groove with which the second quick-change feature is configured to engage.

A32. The quick-change clamp arm of paragraph A31, wherein the second groove is circumferential.

A33. The quick-change clamp arm of any of paragraphs A1-A32, wherein the second anchor pin is separated from a/the second alignment hole by a first distance, wherein the first distance is unique for the size of the clamp arm body.

B1. A robot end effector, comprising:
a first quick-change feature configured to selectively and reversibly connect to a first anchor pin of a quick-change clamp arm, such that the robot end effector is configured to be selectively and reversibly coupled to the quick-change clamp arm via the first anchor pin and the first quick-change feature; and
a tool configured for performing a task on a workpiece.

B2. The robot end effector of paragraph B1, wherein the quick-change clamp arm is the quick-change clamp arm of any of paragraphs A1-A33.

B3. The robot end effector of any of paragraphs B1-B2, further comprising a clamp arm adapter configured to couple the first quick-change feature to the robot end effector.

B4. The robot end effector of paragraph B3, wherein the clamp arm adapter is configured to position the first quick-change feature such that it is accessible to the first anchor pin of the quick-change clamp arm.

B5. The robot end effector of any of paragraphs B3-B4, wherein the clamp arm adapter is configured such that when the quick-change clamp arm is engaged with the first quick-change feature, the quick-change clamp arm is oriented and positioned as desired for performing the task on the workpiece.

B6. The robot end effector of any of paragraphs B3-B5, wherein the first quick-change feature is configured to be coupled to the clamp arm adapter both when the first anchor pin of the quick-change clamp arm is engaged with the first quick-change feature and when the first anchor pin of the quick-change clamp arm is disengaged from the first quick-change feature.

B6.1. The robot end effector of any of paragraphs B3-B6, wherein the clamp arm adapter is configured to be coupled to the robot end effector both when the first anchor pin of the quick-change clamp arm is engaged with the first quick-change feature and when the first anchor pin of the quick-change clamp arm is disengaged from the first quick-change feature.

B7. The robot end effector of any of paragraphs B3-B6.1, wherein the clamp arm adapter is configured to position the first quick-change feature and the quick-change clamp arm.

B7.1. The robot end effector of any of paragraphs B3-B7, wherein the clamp arm adapter comprises a first alignment pin extending from an/the adapter mating surface of the clamp arm adapter, wherein the first alignment pin is configured to prevent rotation of the quick-change clamp arm with respect to the clamp arm adapter when the first anchor pin of the quick-change clamp arm is engaged with the first quick-change feature and the first alignment pin is positioned at least partially within a/the first alignment hole of the quick-change clamp arm.

B7.2. The robot end effector of any of paragraphs B3-B7.1, wherein the clamp arm adapter comprises a/the first alignment pin extending from an/the adapter mating surface of the clamp arm adapter, wherein the first alignment pin is configured to prevent rotation of the quick-change clamp arm with respect to the first quick-change feature when the first anchor pin of the quick-change clamp arm is engaged with the first quick-change feature and the first alignment pin is positioned at least partially within a/the first alignment hole of the quick-change clamp arm.

B7.3. The robot end effector of any of paragraphs B3-B7.2, wherein the clamp arm adapter comprises a/the first alignment pin adjacent the first quick-change feature.

B7.4. The robot end effector of any of paragraphs B3-B7.3, wherein an/the adapter mating surface of the clamp arm adapter is at least substantially parallel to an outer surface of the first quick-change feature.

B7.5. The robot end effector of any of paragraphs B3-B7.4, wherein an/the adapter mating surface of the clamp arm adapter is configured to contact a/the first clamp arm mating surface of the quick-change clamp arm when the first anchor pin of the quick-change clamp arm is engaged with the first quick-change feature of the robot end effector.

B7.6. The robot end effector of paragraph B7.5, wherein the adapter mating surface comprises a first adapter mating surface and a second adapter mating surface.

B7.7. The robot end effector of paragraph B7.6, wherein the first adapter mating surface is configured to contact a/the proximal clamp arm mating surface of the quick-change clamp arm when the first anchor pin is engaged with the first quick-change feature, and wherein the second adapter mating surface is configured to contact a/the distal clamp arm mating surface of the quick-change clamp arm when the first anchor pin is engaged with the first quick-change feature.

B7.8. The robot end effector of any of paragraphs B7.6-B7.7, wherein the first adapter mating surface is proximal to the first quick-change feature and the second adapter mating surface is distal to the first quick-change feature.

B7.9. The robot end effector of any of paragraphs B7.6-B7.8, wherein a/the first alignment pin of the clamp arm adapter extends outwardly from the second adapter mating surface of the clamp arm adapter.

B8. The robot end effector of any of paragraphs B1-B7.9, wherein the first quick-change feature comprises a pneumatically-operated clamp.

B9. The robot end effector of any of paragraphs B1-B8, wherein the first quick-change feature is configured to engage a/the first groove formed in the first anchor pin of the quick-change clamp arm.

B10. The robot end effector of any of paragraphs B1-B9, wherein the first quick-change feature comprises a plurality of jaws that open and close.

B11. The robot end effector of any of paragraphs B1-B10, wherein the first quick-change feature comprises a first Schunk clamp.

B12. The robot end effector of any of paragraphs B1-B11, wherein the first quick-change feature comprises a/the plurality of jaws that are configured to selectively move radially outward to disengage from the first anchor pin, and that are configured to selectively move radially inward to engage the first anchor pin of the quick-change clamp arm.

B13. The robot end effector of any of paragraphs B1-B12, wherein the first quick-change feature is configured to be selectively coupled to the quick-change clamp arm by engaging the first anchor pin and the first quick-change feature with each other via an/the automated system.

B14. The robot end effector of any of paragraphs B1-B13, wherein the first quick-change feature is configured to be selectively decoupled from the quick-change clamp arm by disengaging the first anchor pin and the first quick-change feature from each other via an/the automated system.

B15. The robot end effector of any of paragraphs B1-B14, wherein the first quick-change feature is configured to be selectively and reversibly connected to a plurality of different respective quick-change clamp arms having a plurality of different sizes.

B16. The robot end effector of any of paragraphs B1-B15, wherein the first quick-change feature is configured to be selectively and reversibly connected to a plurality of different quick-change clamp arms having a plurality of different shapes.

B17. The robot end effector of any of paragraphs B1-B16, wherein the robot end effector is a drill motor assembly.

B18. The robot end effector of any of paragraphs B1-B17, wherein the robot end effector is configured to position the quick-change clamp arm with respect to the workpiece such that the quick-change clamp arm applies a normal force to the workpiece while the tool performs the task.

B19. The robot end effector of paragraph B18, wherein the robot end effector is configured such that the first quick-change feature is coupled to the quick-change clamp arm adjacent a/the proximal end region of the quick-change clamp arm, and wherein the robot end effector is configured to position a/the distal end region of the quick-change clamp arm to apply a normal force to the workpiece while the tool performs the task.

B20. The robot end effector of any of paragraphs B1-B19, wherein the tool comprises a drill, a gripper, a cutting tool, a deburring tool, a milling tool, a welding head, a spray gun, and/or a sensor.

B21. The robot end effector of any of paragraphs B1-B20, wherein the task the tool is configured to perform comprises drilling, countersinking, gripping, cutting, milling, deburring, welding, spraying, sensing, and/or a one-up assembly process task.

B22. The robot end effector of any of paragraphs B1-B21, wherein the tool is coupled to a nose piece of the robot end effector.

C1. A system, comprising:
  the quick-change clamp arm of any of paragraphs A1-A33; and
  the robot end effector of any of paragraphs B1-B22.

C2. The system of paragraph C1, wherein the quick-change clamp arm comprises a clamp arm set comprising a plurality of quick-change clamp arms of different sizes and/or shapes.

C3. The system of paragraph C2, wherein the robot end effector is configured to be selectively and reversibly coupled to at least two different respective quick-change clamp arms of the plurality of quick-change clamp arms.

C4. The system of any of paragraphs C1-C3, wherein the robot end effector comprises a plurality of robot end effectors, each respective robot end effector of the plurality of robot end effectors being configured to be selectively and reversibly coupled to the quick-change clamp arm.

C4.1. The system of any of paragraphs C1-C4, further comprising the workpiece.

C4.2. The system of any of paragraphs C1-C4.1, wherein the quick-change clamp arm is configured to pinch the workpiece between a/the pressure foot of the quick-change clamp arm and the tool of the robot end effector.

C4.3. The system of any of paragraphs C1-C4.2, wherein the system is configured such that the tool of the robot end effector contacts the workpiece without gapping, prior to performing the task on the workpiece.

C5. The system of any of paragraphs C1-C4.3, further comprising a robot, wherein the robot end effector is coupled to the robot, and wherein the robot is configured to move the robot end effector and the quick-change clamp arm with respect to the workpiece, in order to perform the task on the workpiece.

C6. The system of paragraph C5, wherein the robot is configured such that the robot end effector is selectively removable from the robot, such that a second robot end effector from a/the plurality of robot end effectors can be selectively coupled to the robot.

C7. The system of any of paragraphs C1-C6, further comprising a storage rack configured to store a/the plurality of quick-change clamp arms when the respective quick-change clamp arms of the plurality of quick-change clamp arms are not coupled to the robot end effector coupled to a/the robot.

C8. The system of paragraph C7, wherein the storage rack is configured to store a/the plurality of robot end effectors when the respective robot end effectors of the plurality of robot end effectors are not coupled to a/the robot.

C9. The system of any of paragraphs C7-C8, wherein the storage rack is configured to store at least two, at least three, at least four, at least five, at least six, at least seven, at least eight, at least nine, and/or at least ten quick-change clamp arms.

C10. The system of any of paragraphs C7-C9, wherein the storage rack is configured to store at least two, at least three, at least four, at least five, at least six, at least seven, at least eight, at least nine, and/or at least ten robot end effectors.

C11. The system of any of paragraphs C7-C10, wherein the storage rack comprises a plurality of second quick-change features, wherein each respective second quick-change feature is configured to selectively and reversibly engage a respective second anchor pin of a respective quick-change clamp arm, such that the respective quick-change clamp arm is configured to be coupled to the storage rack via the second anchor pin and the second quick-change feature.

C12. The system of any of paragraphs C7-C11, wherein the storage rack comprises a plurality of storage spaces, wherein each respective storage space is configured to receive a respective quick-change clamp arm and/or a respective robot end effector.

C13. The system of paragraph C12, wherein each respective storage space of the storage rack comprises a respective second quick-change feature configured to selectively and reversibly engage a respective second anchor pin of a respective quick-change clamp arm, such that the respective quick-change clamp arm is configured to be coupled to the storage rack and stored in the respective storage space via the second anchor pin and the second quick-change feature.

C14. The system of any of paragraphs C7-C13, wherein the storage rack comprises a plurality of second alignment pins extending from each respective storage mating surface of a plurality of storage mating surfaces, wherein each respective second alignment pin is configured to prevent rotation of a respective quick-change clamp arm with respect to the storage rack when the respective second anchor pin of the respective quick-change clamp arm is engaged with the respective second quick-change feature and the respective second alignment pin is positioned at least partially within a/the respective second alignment hole of the respective quick-change clamp arm.

C15. The system of any of paragraphs C7-C14, wherein the storage rack comprises a/the plurality of second alignment pins extending from each respective storage mating surface of a/the plurality of storage mating surfaces, wherein each respective second alignment pin is configured to prevent rotation of a respective quick-change clamp arm with respect to the respective second quick-change feature when the respective second anchor pin of the respective quick-change clamp arm is engaged with the respective second quick-change feature and the respective second alignment pin is positioned at least partially within a/the respective second alignment hole of the respective quick-change clamp arm.

C16. The system of any of paragraphs C7-C15, wherein each of a/the respective second alignment pins is positioned adjacent a respective second quick-change feature of the storage rack.

C17. The system of any of paragraphs C7-C16, wherein the storage rack comprises a/the plurality of storage mating surfaces, wherein the storage rack comprises a respective storage mating surface adjacent each respective second quick-change feature, wherein each storage mating surface is configured to contact a corresponding second clamp arm mating surface of a respective quick-change clamp arm, adjacent the respective second quick-change feature of the storage rack, when the respective second anchor pin of the respective quick-change clamp arm is engaged with the respective second quick-change feature of the storage rack.

C18. The system of any of paragraphs C7-C17, wherein an/the storage mating surface of the storage rack is at least substantially parallel to an outer surface of the second quick-change feature.

C19. The system of any of paragraphs C7-C18, wherein a respective storage mating surface of the storage rack is configured to contact a/the second clamp arm mating surface of a respective quick-change clamp arm when the second anchor pin of the respective quick-change clamp arm is engaged with a respective second quick-change feature of the storage rack.

C20. The system of any of paragraphs C7-C19, wherein each respective second alignment pin of a/the plurality of second alignment pins of the storage rack extends outwardly from a respective storage mating surface of the storage rack.

C21. The system of any of paragraphs C7-C20, wherein the storage rack comprises a/the plurality of storage spaces, and wherein each respective storage space of the plurality of storage spaces comprises a respective second quick-change feature and a respective storage mating surface.

C22. The system of paragraph C21, wherein each respective storage space of the storage rack comprises a respective base plate configured to couple the respective second quick-change feature to the storage rack, in the respective storage space.

C23. The system of paragraph C22, wherein each respective storage space of the storage rack comprises a respective pin block assembly.

C24. The system of paragraph C23, wherein each respective pin block assembly is formed integrally with a respective base plate.

C25. The system of paragraph C23, wherein each respective pin block assembly is coupled to a respective base plate.

C26. The system of any of paragraphs C23-C25, wherein each respective pin block assembly comprises a/the respective storage mating surface.

C27. The system of any of paragraphs C23-C26, wherein each respective pin block assembly comprises a/the respective second alignment pin extending therefrom.

C28. The system of any of paragraphs C23-C27, wherein each respective pin block assembly comprises at least one respective vertical mating surface that is at least substantially perpendicular to the respective storage mating surface, wherein each of the at least one vertical mating surfaces is configured to contact and stabilize a respective quick-change clamp arm when the respective quick-change clamp arm is engaged with the respective second quick-change feature of the respective storage space.

C29. The system of any of paragraphs C7-C28 wherein a respective second distance between a respective center of a respective second quick-change feature and a respective second alignment pin in a respective storage space is different from the respective second distances between the respective centers of the respective second quick-change features and the respective second alignment pins in respective other storage spaces of the storage rack.

C30. The system of any of paragraphs C12-C29, wherein each respective storage space of the storage rack is configured to receive a different respective size of quick-change clamp arm.

C31. The system of any of paragraphs C12-C30, wherein the storage rack is configured such that a/the robot can access and remove a respective quick-change clamp arm stored in any respective storage space of the storage rack.

C31.1. The system of any of paragraphs C7-C31, wherein the storage rack is a two-tiered storage rack.

C31.2. The system of any of paragraphs C7-C31.1, wherein the storage rack is configured to store a plurality of quick-change clamp arms in a first portion of the storage rack, and wherein the storage rack is configured to store a plurality of robot end effectors in a second portion of the storage rack.

C31.3. The system of any of paragraphs C7-C31.2, wherein the storage rack is configured to store a plurality of respective quick-change clamp arms such that each respective quick-change clamp arm is spaced apart from the other respective quick-change clamp arms.

C31.4. The system of any of paragraphs C7-C31.3, wherein the storage rack is configured to store a plurality of respective robot end effectors such that each respective robot end effector is spaced apart from the other respective robot end effectors.

C32. The system of any of paragraphs C1-C31.4, wherein a/the clamp arm set comprises a/the plurality of quick-change clamp arms, wherein each respective quick-change clamp arm within the clamp arm set has a different respective first distance between its respective second anchor pin and respective second alignment hole.

C33. The system of any of paragraphs C1-C32, wherein a/the clamp arm set comprises a/the plurality of quick-change clamp arms, wherein each respective quick-change clamp arm within the clamp arm set is configured to be placed in a different respective storage space of a/the storage rack, when the respective quick-change clamp arm is not coupled to the robot end effector.

C33.1. The system of any of paragraphs C1-C33, wherein a/the clamp arm set comprises a/the plurality of quick-change clamp arms, wherein each respective quick-change clamp arm within the clamp arm set is configured to be placed in a different respective storage space of a/the storage rack when the respective quick-change clamp arm is not coupled to the robot end effector, based on the respective first distance of the respective quick-change clamp arm and the respective second distance of the respective storage space of the storage rack.

C34. The system of any of paragraphs C1-C33.1, further comprising a work cell in which a/the storage rack, the workpiece, a/the robot, a/the plurality of robot end effectors, and a/the plurality of quick-change clamp arms are located.

C35. The system of any of paragraphs C1-C34, wherein the system comprises a first robot and a second robot within a/the work cell, wherein the first robot and the second robot are each configured to perform one or more tasks on or to the workpiece.

C36. The system of any of paragraphs C1-C35, wherein the system comprises three different robot end effectors per robot.

C37. The system of any of paragraphs C1-C36, wherein the system comprises five different quick-change clamp arms per robot.

C38. The system of any of paragraphs C1-C37, wherein the system is configured to perform a one-up assembly process on or to the workpiece.

C39. The system of any of paragraphs C1-C38, wherein the system is configured for completely automated removal of a respective quick-change clamp arm from the robot end effector.

C40. The system of any of paragraphs C1-C39, wherein the system is configured for completely automated coupling of a respective quick-change clamp arm to the robot end effector.

C41. The system of any of paragraphs C1-C40, wherein the system is configured for completely automated selection of a respective quick-change clamp arm from amongst a/the plurality of quick-change clamp arms of a/the clamp arm set.

C42. The system of any of paragraphs C1-C41, wherein the system is configured for completely automated storage of a respective quick-change clamp arm in a/the storage rack.

C43. The system of any of paragraphs C1-C42, wherein the system is configured for completely automated coupling of a respective quick-change clamp arm to the robot end effector while the respective quick-change clamp arm is stored in a/the storage rack.

C44. The system of any of paragraphs C1-C43, wherein the system is configured to reduce the number of robot end effectors in a/the work cell.

C45. The system of any of paragraphs C1-C44, wherein the system is configured to increase flexibility of tasks and/or types of workpieces in a/the work cell.

D1. A method, comprising:
removing a first hardware article from a robot end effector by disengaging a first quick-change feature coupling the first hardware article to the robot end effector; and
coupling a second hardware article to the robot end effector by engaging the first quick-change feature, thereby coupling the second hardware article to the robot end effector.

D2. The method of paragraph D1, wherein the first hardware article is the quick-change clamp arm of any of paragraphs A1-A33.

D3. The method of any of paragraphs D1-D2, wherein the second hardware article is the quick-change clamp arm of any of paragraphs A1-A33.

D4. The method of any of paragraphs D1-D3, wherein the second hardware article is different from the first hardware article.

D5. The method of any of paragraphs D1-D4, wherein the robot end effector is the robot end effector of any of paragraphs B1-1322.

D6. The method of any of paragraphs D1-D5, wherein the removing the first hardware article from the robot end effector is automated.

D7. The method of any of paragraphs D1-D6, wherein the coupling the second hardware article to the robot end effector is automated.

D8. The method of any of paragraphs D1-D7, further comprising selecting the second hardware article from amongst a plurality of hardware articles.

D9. The method of paragraph D8, wherein the selecting the second hardware article is automated.

D10. The method of any of paragraphs D1-D9, further comprising retrieving the second hardware article from a storage rack containing a/the plurality of hardware articles.

D10.1. The method of paragraph D10, wherein the retrieving the second hardware article from the storage rack comprises disengaging a respective second quick-change feature coupling the second hardware article to the storage rack.

D10.2. The method of paragraph D10.1, wherein the respective second quick-change feature remains coupled to the storage rack after the retrieving the second hardware article from the storage rack.

D11. The method of any of paragraphs D1-D10.2, further comprising placing the first hardware article into a storage space of a/the storage rack.

D11.1. The method of paragraph D11, wherein the placing the first hardware article into the storage space of the storage rack comprises engaging a respective second quick-change feature of the storage rack, thereby coupling the first hardware article to the storage rack.

D12. The method of paragraph D11 or D11.1, wherein the placing the first hardware article into the storage space is performed after the removing the first hardware article from the robot end effector.

D13. The method of paragraph D11, wherein the placing the first hardware article into the storage space is performed contemporaneously with the removing the first hardware article from the robot end effector.

D14. The method of any of paragraphs D11-D13, wherein the placing the first hardware article into the storage space comprises placing the first hardware article in a pre-determined storage space among a plurality of storage spaces within the storage rack, based on the size of the first hardware article.

D15. The method of any of paragraphs D1-D14, wherein the first quick-change feature remains coupled to the robot end effector after the removing the first hardware article from the robot end effector.

D16. The method of any of paragraphs D1-D15, wherein the removing the first hardware article from the robot end effector is performed in a work cell.

D17. The method of any of paragraphs D1-D16, wherein the coupling the second hardware article to the robot end effector is performed in a/the work cell.

D18. The method of any of paragraphs D1-D17, further comprising positioning a workpiece in a/the work cell.

D19. The method of paragraph D18, wherein the workpiece is a structure or component of an aircraft.

D20. The method of any of paragraphs D1-D19, further comprising coupling the robot end effector to a robot configured to perform a task on a/the workpiece in a/the work cell.

D21. The method of any of paragraphs D1-D20, further comprising removing the robot end effector from a/the robot and storing the robot end effector in a/the storage rack in a/the work cell.

D22. The method of any of paragraphs D1-D21, further comprising retrieving a second robot end effector from a/the storage rack in a/the work cell and coupling the second robot end effector to a/the robot configured to perform a task on a/the workpiece in the work cell.

D23. The method of any of paragraphs D1-D22, further comprising performing a/the task on a/the workpiece in a/the work cell.

D24. The method of paragraph D23, wherein the task is an automated assembly operation.

D25. The method of paragraph D23 or D24, wherein the performing the task comprises performing a one-up drill and countersink operation.

D26. The method of any of paragraphs D23-D25, wherein the performing the task comprises performing a simultaneous drill and countersink operation.

D27. The method of any of paragraphs D23-D26, wherein the performing the task comprises performing an operation on a first side of the workpiece and simultaneously applying a stabilizing normal force to a second side of the workpiece.

D28. The method of paragraph D27, wherein the performing the operation on the first side of the work piece is performed using a tool of the robot end effector.

D29. The method of paragraph D27 or D28, wherein the applying the stabilizing normal force to the second side of the workpiece is performed using the first hardware article.

D30. The method of any of paragraphs D27-D29, wherein the applying the stabilizing normal force to the second side of the workpiece is performed using the second hardware article.

D30.1. The method of any of paragraphs D27-D30, wherein the applying the stabilizing normal force comprises pressing a pressure foot of the first hardware article against the second side of the workpiece.

D30.2. The method of any of paragraphs D27-D30.1, wherein the applying the stabilizing normal force comprises pressing a second pressure foot of the second hardware article against the second side of the workpiece.

D30.3. The method of any of paragraphs D30.1 or D30.2, wherein the pressing the pressure foot of the first hardware article against the second side of the workpiece comprises contacting the second side of the workpiece with a contact button coupled to the pressure foot, such that the workpiece is pinched between the contact button and the tool of the robot end effector.

D30.4. The method of any of paragraphs D30.1-D30.3, further comprising removing a/the contact button coupled to the pressure foot from the pressure foot and replacing the contact the button with a replacement contact button by pressing the replacement contact button into place within a hole in the pressure foot.

D31. The method of any of paragraphs D1-D30.4, further comprising retaining a plurality of hardware articles in a/the storage rack.

D32. The method of any of paragraphs D1-D31, further comprising retaining the first hardware article in a/the storage rack after the removing the first hardware article from the robot end effector.

D33. The method of any of paragraphs D1-D32, further comprising removing the second hardware article from the robot end effector by disengaging the first quick-change feature and retaining the second hardware article in a/the storage rack after the removing the second hardware article from the robot end effector.

D34. The method of any of paragraphs D1-D33, further comprising unloading a/the workpiece and removing the workpiece from a/the work cell.

D35. The method of any of paragraphs D1-D34, further comprising loading a second workpiece and repeating any of the methods of paragraphs D1-D34 with respect to the second workpiece.

D36. The method of any of paragraphs D1-D35, comprising retaining one or more hardware articles apart from one or more robot end effectors in a/the storage rack.

D37. The method of any of paragraphs D1-D36, comprising disengaging the first quick-change feature by pneumatically unlocking the first quick-change feature, thereby releasing a respective hardware article coupled to the robot end effector.

D38. The method of any of paragraphs D1-D37, comprising engaging the first quick-change feature by pneumatically locking the first quick-change feature about a respective first anchor pin of a respective hardware article, thereby coupling the respective hardware article to the robot end effector.

D39. The method of any of paragraphs D1-D38, comprising engaging a/the second quick-change feature by pneumatically locking the second quick-change feature about a respective second anchor pin of a respective hardware article, thereby coupling the respective hardware article to a/the storage rack.

D40. The method of any of paragraphs D1-D39, comprising disengaging a/the second quick-change feature by pneumatically unlocking the second quick-change feature, thereby releasing a respective hardware article coupled to a/the storage rack.

E1. Use of the quick-change clamp arm of any of paragraphs A1-A33 to perform an assembly operation, perform a task, and/or perform a manufacturing process in assembly of an aircraft.

F1. Use of the robot end effector of any of paragraphs B1-1322 to perform an assembly operation, perform a task, and/or perform a manufacturing process in assembly of an aircraft.

G1. Use of the system of any of paragraphs C1-C45 to perform an assembly operation, perform a task, and/or perform a manufacturing process in assembly of an aircraft.

H1. Use of the system of any of paragraphs C1-C45 to remove a first quick-change clamp arm from a robot end effector and couple a second quick-change clamp arm to the robot end effector.

As used herein, the terms "selective" and "selectively," when modifying an action, movement, configuration, or other activity of one or more components or characteristics of an apparatus, mean that the specific action, movement, configuration, or other activity is a direct or indirect result of user manipulation of an aspect of, or one or more components of, the apparatus.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

The various disclosed elements of apparatuses and steps of methods disclosed herein are not required to all apparatuses and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed apparatus or method. Accordingly, such inventive subject matter is not required to be associated with the specific apparatuses and methods that are expressly disclosed herein, and such inventive subject matter may find utility in apparatuses and/or methods that are not expressly disclosed herein.

The invention claimed is:

1. A method, comprising:

removing a first quick-change clamp arm from a robot end effector of a robot by disengaging a first quick-change feature coupling the first quick-change clamp arm to the robot end effector, wherein disengaging the first quick-change feature comprises releasing a first anchor pin of the first quick-change clamp arm from the first quick-change feature by moving a first plurality of jaws of the first quick-change feature radially outward away from the first anchor pin, wherein the removing of the first quick-change clamp arm from the robot end effector is automated, and wherein the first anchor pin extends from an inner surface of the first quick-change clamp arm, the first anchor pin being configured to be selectively and reversibly connected to the first quick-change feature of the robot end effector, such that the first quick-change clamp arm is configured to be removably coupled to the robot end effector via the first anchor pin and the first quick-change feature;

engaging the first quick-change clamp arm with a second quick-change feature spaced apart from the robot by inserting a second anchor pin of the first quick-change clamp arm into the second quick-change feature and clamping the second anchor pin within the second quick-change feature by moving a second plurality of jaws of the second quick-change feature radially inward towards the second anchor pin, wherein the engaging is completed prior to the removing, such that the first quick-change clamp arm is secured prior to the removing of the first quick-change clamp arm from the robot end effector, and wherein the second anchor pin extends from an outer surface of the first quick-change clamp arm, the second anchor pin of the first quick-change clamp arm being configured to be selectively and reversibly connected to the second quick-change feature;

coupling a second quick-change clamp arm to the robot end effector by engaging a third anchor pin of the second quick-change clamp arm with the first quick-change feature and clamping the first plurality of jaws around the third anchor pin by moving the first plurality of jaws radially inward toward the third anchor pin, wherein the coupling of the second quick-change clamp arm to the robot end effector is automated, and wherein the third anchor pin extends from a second inner surface of the second quick-change clamp arm, the third anchor pin being configured to be selectively and reversibly connected to the first quick-change feature of the robot end effector, such that the second quick-change clamp arm is configured to be removably coupled to the robot end effector via the third anchor pin and the first quick-change feature; and disengaging the second quick-change clamp arm from a third quick-change feature spaced apart from the robot by removing a fourth anchor pin of the second quick-change clamp arm from the third quick-change feature, wherein the disengaging is completed after the coupling, such that the second quick-change clamp arm is secured prior to the coupling of the second quick-change clamp arm to the robot end effector, wherein the fourth anchor pin extends from a second outer surface of the second quick-change clamp arm, and wherein each of the first quick-change clamp arm and the second quick-change clamp arm comprises a respective pressure foot configured to apply a localized stabilizing normal force to a second side of a workpiece while the robot end effector performs an operation on a first side of the workpiece, while a respective quick-change clamp arm is coupled to the robot end effector.

2. The method according to claim 1, further comprising:

coupling the robot end effector to the robot, wherein the robot is configured to perform a task on the workpiece in a work cell;

performing the task on the workpiece in the work cell, wherein the performing of the task comprises performing the operation on the first side of the workpiece and simultaneously applying the localized stabilizing normal force to the second side of the workpiece, wherein the performing of the operation on the first side of the workpiece is performed using a tool of the robot end effector, wherein the applying the stabilizing normal force to the second side of the workpiece comprises pressing the pressure foot of the first quick-change clamp arm against the second side of the workpiece, wherein the performing of the task is performed at a first location in the work cell, and wherein the first location is spaced apart from a second location where the coupling of the second quick-change clamp arm is performed.

3. The method according to claim 2, wherein the removing of the first quick-change clamp arm is performed in the work cell, wherein the coupling of the second quick-change clamp arm is performed in the work cell, and wherein the workpiece comprises a structure or component of an aircraft.

4. The method according to claim 2, wherein the performing the task comprises performing a simultaneous drill and countersink operation.

5. The method according to claim 2, wherein the pressing of the pressure foot of the first quick-change clamp arm comprises contacting the second side of the workpiece with a contact button coupled to the pressure foot, such that the workpiece is pinched between the contact button and the tool of the robot end effector.

6. The method according to claim 5, further comprising removing the contact button from the pressure foot and replacing the contact button with a replacement contact button by pressing the replacement contact button into place within a hole in the pressure foot.

7. The method according to claim 1, wherein the first quick-change feature remains coupled to the robot end effector after the removing of the first quick-change clamp arm from the robot end effector.

8. The method according to claim 1, wherein the removing of the first quick-change clamp arm comprises pneumatically unlocking the first quick-change feature, thereby releasing the first quick-change clamp arm from the robot end effector, and wherein the coupling of the second quick-change clamp arm comprises pneumatically locking the first quick-change feature about the third anchor pin.

9. The method according to claim 1, wherein the second quick-change feature is located on a storage rack that stores and supports the second quick-change clamp arm prior to the coupling of the second quick-change clamp arm to the robot end effector.

10. The method according to claim 1, further comprising engaging the second quick-change feature by pneumatically locking the second quick-change feature about the second anchor pin of the first quick-change clamp arm.

11. The method according to claim 1, wherein the first quick-change clamp arm comprises a first alignment hole and a second alignment hole, wherein the removing of the first quick-change clamp arm further comprises removing a first alignment pin of the robot end effector from the first alignment hole, and wherein the engaging of the first quick-change clamp arm further comprises inserting a second alignment pin into the second alignment hole.

12. A method, comprising:
engaging a first anchor pin of a first quick-change clamp arm with a first quick-change feature of a robot end effector, thereby selectively and reversibly coupling the first quick-change clamp arm to the robot end effector via the first anchor pin and the first quick-change feature, wherein the first anchor pin extends from an inner surface of the first quick-change clamp arm, wherein the first anchor pin comprises a first circumferential groove, and wherein the engaging of the first anchor pin with the first quick-change feature comprises clamping a first plurality of jaws of the first quick-change feature around the first circumferential groove by moving the first plurality of jaws radially inward towards the first anchor pin;

disengaging the first quick-change feature of the robot end effector, thereby releasing the first anchor pin of the first quick-change clamp arm and selectively and reversibly removing the first quick-change clamp arm from the robot end effector, wherein the removing of the first quick-change clamp arm from the robot end effector is automated;

engaging a second anchor pin of the first quick-change clamp arm with a second quick-change feature spaced apart from the robot end effector, thereby selectively and reversibly securing the first quick-change clamp arm to the second quick-change feature via the second anchor pin and the second quick-change feature, wherein the second anchor pin extends from an outer surface of the first quick-change clamp arm, wherein the second anchor pin comprises a second circumferential groove, and wherein the engaging of the second anchor pin with the second quick-change feature comprises clamping a second plurality of jaws of the second quick-change feature around the second circumferential groove by moving the second plurality of jaws radially inward towards the second anchor pin; and coupling a second quick-change clamp arm to the robot end effector by engaging a third anchor pin of the second quick-change clamp arm with the first quick-change feature of the robot end effector, wherein the coupling of the second quick-change clamp arm to the robot end effector is automated, and wherein each of the first quick-change clamp arm and the second quick-change clamp arm comprises a respective pressure foot configured to apply a localized normal force to a first side of a workpiece while the robot end effector performs an operation on a second side of the workpiece, while a respective quick-change clamp arm is coupled to the robot end effector.

13. A method, comprising:
removing a first quick-change clamp arm from a robot end effector of a robot by disengaging a first quick-change feature coupling the first quick-change clamp arm to the robot end effector, wherein disengaging the first quick-change feature comprises releasing a first anchor pin of the first quick-change clamp arm from the first quick-change feature by moving a first plurality of jaws of the first quick-change feature radially outward away from the first anchor pin, wherein the removing of the first quick-change clamp arm from the robot end effector is automated;

engaging the first quick-change clamp arm with a second quick-change feature spaced apart from the robot by inserting a second anchor pin of the first quick-change clamp arm into the second quick-change feature and clamping the second anchor pin within the second quick-change feature by moving a second plurality of jaws of the second quick-change feature radially inward towards the second anchor pin, wherein the engaging is completed prior to the removing, such that the first quick-change clamp arm is secured prior to the removing of the first quick-change clamp arm from the robot end effector;

placing the first quick-change clamp arm into a first storage space of a storage rack containing a plurality of quick-change clamp arms, wherein the storage rack comprises a plurality of quick-change features that includes the second quick-change feature and a third quick-change feature, wherein the placing the first quick-change clamp arm into the first storage space of the storage rack comprises engaging the second quick-change feature of the plurality of quick-change features of the storage rack, thereby coupling the first quick-change clamp arm to the storage rack;

selecting a second quick-change clamp arm from amongst the plurality of quick-change clamp arms, wherein the selecting the second quick-change clamp arm is automated;

retrieving the second quick-change clamp arm from a second storage space of the storage rack, wherein the retrieving the second quick-change clamp arm from the second storage space of the storage rack comprises disengaging the third quick-change feature coupling the second quick-change clamp arm to the storage rack;

coupling the second quick-change clamp arm to the robot end effector by engaging a third anchor pin of the second quick-change clamp arm with the first quick-change feature and clamping the first plurality of jaws around the third anchor pin by moving the first plurality of jaws radially inward toward the third anchor pin, wherein the coupling of the second quick-change clamp arm to the robot end effector is automated; and disengaging the second quick-change clamp arm from the third quick-change feature spaced apart from the robot by removing a fourth anchor pin of the second quick-change clamp arm from the third quick-change feature, wherein the disengaging the second quick-change clamp arm is completed after the coupling, such that the second quick-change clamp arm is secured prior to the coupling of the second quick-change clamp arm to the robot end effector.

14. The method according to claim 13, wherein the first storage space is a pre-determined storage space selected from among a plurality of storage spaces within the storage rack, wherein the first storage space is selected based on a size of the first quick-change clamp arm.

15. The method according to claim 13, wherein the placing the first quick-change clamp arm into the first storage space is performed contemporaneously with the removing the first quick-change clamp arm from the robot end effector.

16. The method according to claim 13, wherein the retrieving the second quick-change clamp arm from the second storage space is performed contemporaneously with the coupling the second quick-change clamp arm to the robot end effector.

17. The method according to claim 13, wherein the storage rack comprises a plurality of respective storage spaces, wherein each respective storage space comprises a respective quick-change feature, and wherein each respective quick-change feature remains coupled to the storage rack after retrieving a respective quick-change clamp arm from the respective storage space.

18. The method according to claim 13, wherein the engaging of the second quick-change feature of the storage rack comprises pneumatically locking the second quick-change feature, thereby coupling the first quick-change clamp arm to the storage rack.

19. The method according to claim 13, wherein the first quick-change clamp arm comprises a first alignment hole and a second alignment hole, wherein the removing of the first quick-change clamp arm further comprises removing a first alignment pin of the robot end effector from the first alignment hole, and wherein the engaging of the first quick-change clamp arm further comprises inserting a second alignment pin into the second alignment hole.

20. The method according to claim 13, wherein the first quick-change feature remains coupled to the robot end effector after the removing of the first quick-change clamp arm from the robot end effector.

* * * * *